(12) United States Patent
Timmins et al.

(10) Patent No.: US 7,724,878 B2
(45) Date of Patent: *May 25, 2010

(54) TECHNIQUE FOR ASSISTING A USER WITH INFORMATION SERVICES AT AN INFORMATION/CALL CENTER

(76) Inventors: Timothy A. Timmins, 9600 SW. Whispering Fir Dr., Beaverton, OR (US) 97007; John S. Miller, 660 SE. Ponderosa Ct., Canby, OR (US) 97013; Christopher A. Huey, 22365 NW. Pihl Rd., Banks, OR (US) 97106; Philip A. Ljubicich, 19325-47th Ave. NE., Lake Forest Park, WA (US) 98155; Karen L. Johnson, 1144 SE. Nehalem St., Portland, OR (US) 97202

( * ) Notice: Subject to any disclaimer, the term of this patent is extended or adjusted under 35 U.S.C. 154(b) by 1247 days.

This patent is subject to a terminal disclaimer.

(21) Appl. No.: 11/191,701

(22) Filed: Jul. 28, 2005

(65) Prior Publication Data

US 2006/0018441 A1 Jan. 26, 2006

Related U.S. Application Data

(63) Continuation-in-part of application No. 10/396,016, filed on Mar. 25, 2003, now abandoned, and a continuation-in-part of application No. 09/865,230, filed on May 25, 2001, now abandoned.

(60) Provisional application No. 60/666,221, filed on Mar. 29, 2005.

(51) Int. Cl.
*H04M 1/64* (2006.01)

(52) U.S. Cl. ............... 379/88.12; 340/905; 379/114.01; 379/201.01; 379/218.01; 455/414.1; 455/456.2; 455/564; 701/201; 701/208; 704/270.1

(58) Field of Classification Search ............ 379/52, 379/201.02, 207.04, 221.13, 218.01, 219, 379/220.01, 88.12, 114.01, 201.01; 455/461, 455/414.1, 456.2, 564; 704/270.1; 707/3; 340/905; 701/201, 208

See application file for complete search history.

(56) References Cited

U.S. PATENT DOCUMENTS

| | | | |
|---|---|---|---|
| 4,551,581 A | | 11/1985 | Doughty |
| 4,582,956 A | | 4/1986 | Doughty |
| 4,969,185 A | | 11/1990 | Dorst et al. |
| 5,058,152 A | | 10/1991 | Solomon et al. |
| 5,163,083 A | | 11/1992 | Dowden et al. |
| 5,450,476 A | | 9/1995 | D'Apuzzo et al. |
| 5,509,049 A | * | 4/1996 | Peterson ...................... 455/563 |
| 5,613,006 A | * | 3/1997 | Reese .......................... 379/67.1 |
| 5,644,711 A | | 7/1997 | Murphy |
| 5,652,789 A | | 7/1997 | Miner et al. |
| 5,675,637 A | | 10/1997 | Szlam et al. |
| 5,684,867 A | * | 11/1997 | Gesslein et al. ......... 379/114.14 |
| 5,689,547 A | | 11/1997 | Molne |
| 5,737,700 A | * | 4/1998 | Cox et al. ................ 455/414.1 |
| 5,742,905 A | * | 4/1998 | Pepe et al. .................. 455/461 |
| 5,809,114 A | | 9/1998 | Solomon et al. |
| 5,835,570 A | | 11/1998 | Wattenbarger |
| 5,854,836 A | | 12/1998 | Nimmagadda |
| 5,873,032 A | | 2/1999 | Cox et al. |
| 5,926,754 A | | 7/1999 | Cirelli et al. |
| 5,933,778 A | | 8/1999 | Buhrmann et al. |
| 5,943,417 A | | 8/1999 | Cox et al. |
| 5,953,393 A | | 9/1999 | Culbreth et al. |
| 5,966,437 A | | 10/1999 | Cox et al. |
| 6,035,190 A | | 3/2000 | Cox et al. |
| 6,052,439 A | * | 4/2000 | Gerszberg et al. ......... 379/88.01 |
| 6,055,512 A | | 4/2000 | Dean et al. |
| 6,058,169 A | | 5/2000 | Bramnick et al. |
| 6,064,878 A | | 5/2000 | Denker et al. |
| 6,065,016 A | | 5/2000 | Stuntebeck et al. |
| 6,073,023 A | | 6/2000 | Tirabassi et al. |
| 6,188,756 B1 | * | 2/2001 | Mashinsky ............. 379/207.04 |
| 6,219,410 B1 | | 4/2001 | Sun |
| 6,269,337 B1 | * | 7/2001 | Desmond et al. ......... 704/270.1 |
| 6,310,944 B1 | | 10/2001 | Brisebois et al. |
| 6,324,271 B1 | | 11/2001 | Sawyer et al. |
| 6,343,120 B1 | | 1/2002 | Rhodes |
| 6,381,325 B1 | * | 4/2002 | Hanson ................. 379/218.01 |

| | | | |
|---|---|---|---|
| 6,389,114 B1 * | 5/2002 | Dowens et al. ................ 379/52 |
| 6,404,876 B1 | 6/2002 | Smith et al. |
| 6,404,884 B1 | 6/2002 | Marwell et al. |
| 6,442,267 B2 * | 8/2002 | Culli et al. ............. 379/220.01 |
| 6,463,131 B1 | 10/2002 | French-St. George et al. |
| 6,483,910 B1 | 11/2002 | Council |
| 6,542,596 B1 | 4/2003 | Hill et al. |
| 6,580,904 B2 * | 6/2003 | Cox et al. ................ 455/456.2 |
| 6,594,352 B1 * | 7/2003 | Smith .................... 379/114.01 |
| 6,665,389 B1 | 12/2003 | Haste |
| 6,687,340 B1 | 2/2004 | Goldberg et al. |
| 6,694,006 B1 * | 2/2004 | Klostermann ......... 379/221.13 |
| 6,697,632 B1 | 2/2004 | Sood |
| 6,714,536 B1 | 3/2004 | Dowling |
| 6,716,101 B1 | 4/2004 | Meadows et al. |
| 6,731,927 B1 | 5/2004 | Stern et al. |
| 6,738,461 B2 | 5/2004 | Trandal et al. |
| 6,765,996 B2 | 7/2004 | Baxter, Jr. |
| 6,775,371 B2 * | 8/2004 | Elsey et al. ............ 379/218.01 |
| 6,795,543 B1 * | 9/2004 | Cartier et al. ............... 379/219 |
| 6,798,772 B2 | 9/2004 | Bergman et al. |
| 6,853,636 B1 | 2/2005 | Merchant |
| 6,868,268 B2 | 3/2005 | Worsham et al. |
| 6,870,915 B2 * | 3/2005 | Stillman et al. ........ 379/201.01 |
| 6,917,674 B2 | 7/2005 | Gilbert |
| 6,934,378 B2 * | 8/2005 | Baker et al. ............ 379/218.01 |
| 6,944,273 B2 | 9/2005 | Huna |
| 6,990,189 B2 | 1/2006 | Ljubicich |
| 6,999,574 B2 * | 2/2006 | Baker .................... 379/218.01 |
| 7,180,994 B2 * | 2/2007 | Scott ..................... 379/218.01 |
| 7,184,754 B1 * | 2/2007 | Farmar ................... 455/414.1 |
| 2001/0049617 A1 | 12/2001 | Berenson et al. |
| 2002/0032589 A1 | 3/2002 | Shah |
| 2002/0118800 A1 | 8/2002 | Martinez et al. |
| 2003/0206616 A1 | 11/2003 | Dowdy |
| 2003/0223551 A1 | 12/2003 | Kafri |
| 2004/0203713 A1 | 10/2004 | Strunk |
| 2004/0213385 A1 | 10/2004 | Hartselle |
| 2005/0250483 A1 | 11/2005 | Malik |
| 2008/0256044 A1 * | 10/2008 | Anderson et al. .............. 707/3 |

OTHER PUBLICATIONS

Napoli, Lisa, "Plans for Wireless Directory Raise Concerns About Privacy", The New York Times, Jan. 26, 2004, available at http://www.nytimes.com/2004/01/26/technology/26directory.html?ex=1390539600&en=1f53122f41b3cf0a&ei=5007&partner=USERLAND.

* cited by examiner

*Primary Examiner*—Gerald Gauthier
(74) *Attorney, Agent, or Firm*—Sofer & Haroun, LLP

(57) ABSTRACT

A service providing information assistance may maintain for a subscriber contacts folders comprising private directories of the subscriber, and a personal profile containing the subscriber's preferences. When a user calls the service to attempt to communicate with a desired party through the service, the service can ascertain whether the desired party has a personal profile and/or a contacts folder associated with him/her. If so, the caller is allowed to communicate with the desired party on the terms and conditions defined by the desired party in his/her personal profile and/or contacts folder. For instance, the desired party may have defined therein who should be allowed to contact him/her, when he/she should be contacted, by what communication means, and whether the caller can be told any of the desired party's communication addresses (e.g., telephone number, email address, etc.).

31 Claims, 18 Drawing Sheets

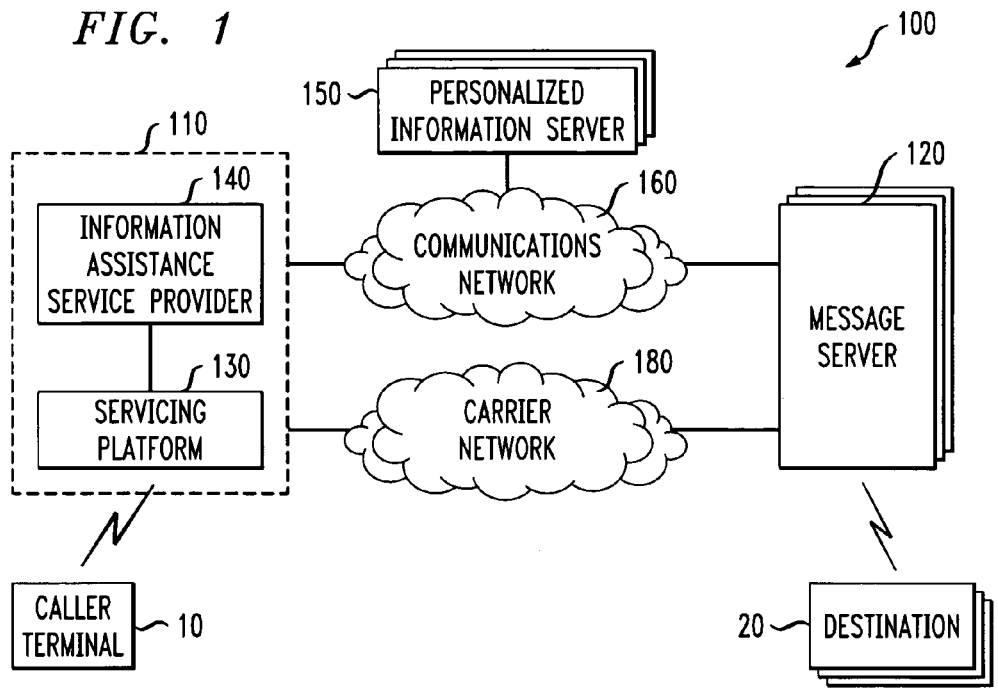

FIG. 9

SUBSCRIBER PERSONAL PROFILE

FIRST NAME: Laura  MIDDLE NAME: Millhouse  LAST NAME: Feldman

LISTINGS: Laura Millhouse Feldman

1feldman@corp.com

| Identifiers | Disclose (910) | Connect (920) | Day (930) | Time (940) | Unauthorized Message (Voice) (950) | Unauthorized Message (E-Mail) (960) |
|---|---|---|---|---|---|---|
| Class: Relatives | N | N | | | Recording 1 | Content 1 |
| Class: Friends | N | N | | | Recording 1 | Content 1 |
| Name: Duffy Dyer | N | Y | 12/13/04 | 8a-5p | Text 1 | Content 3 |
| Name: Corey Feldman | Y | Y | M-F | 8a-5p | Text 2 | Content 4 |
| Class: Business Associates | Y | Y | All | All | | |
| Name: Martin Feldman | | | All | All | | |
| Class: Unknown | N | N | | | Recording 3 | Content 5 |

FIG. 10

INFORMATION ABOUT YOU

| Last Name | Dyer |
| First Name | Duffy |
| E-mail address | Dyer@metsalum.com |

WHO WOULD YOU LIKE TO SEND AN E-MAIL TO?

| Last Name | Feldman |
| First Name | Laura |
| Password | Mets |

E-MAIL BODY

Subject: Tonight

Content: Laura: I'm going to be delayed. Can we Meet at 7:30 instead of 7:00?

*FIG. 11A*

```
                    SUBSCRIBER CONTACTS FOLDER
            FIRST NAME      MIDDLE NAME      LAST NAME
           [  Laura  ]      [ Millhouse ]    [ Feldman ]

FIRST NAME      MIDDLE NAME      LAST NAME
              Martin         Hunchback        Feldman Address 1:          Fax 1:
        Address 2:          Fax 2:
        Past Address 1:     E-mail 1:
        Past Address 2:     E-mail 2:
        City:               Pager 1:
        State:              Pager 2:
        Postal Code:        Other 1
        Country:            Other 2
        Home 1:             Other 3
        Home 2:             Other 4              ⌐1110
        Mobile 1:           Class: Relative  ⌐1120
        Mobile 2:           Mother's Maiden: Jekyll
        Business 1:         Voice Sample? (Y/N): Y ⌐1140
        Business 2:         Subscriber Password: Cold Pizza ⌐1130
```

*FIG. 11B*

```
SUBSCRIBER CONTACTS FOLDER
   FIRST NAME    MIDDLE NAME    LAST NAME
   [ Laura ]     [ Millhouse ]  [ Feldman ]

FIRST NAME    MIDDLE NAME    LAST NAME
     Corey          Frog          Feldman Address 1:              Fax 1:
Address 2:              Fax 2:
Past Address 1:         E-mail 1:
Past Address 2:         E-mail 2:
City:                   Pager 1:
State:                  Pager 2:
Postal Code:            Other 1
Country:                Other 2
Home 1:                 Other 3
Home 2:                 Other 4          ⟋ 1110
Mobile 1:               Class: Relative  
Mobile 2:               Mother's Maiden: Goonie ⟋ 1120
Business 1:             Voice Sample? (Y/N): N ⟋ 1140
Business 2:             Subscriber Password: Goonie ⟋ 1130
```

FIG. 11C

```
SUBSCRIBER CONTACTS FOLDER
      FIRST NAME      MIDDLE NAME      LAST NAME
      [ Laura ]       [ Millhouse ]    [ Feldman ]

FIRST NAME      MIDDLE NAME      LAST NAME
       Duffy            Jerry            Dyer Address 1:          Fax 1:
   Address 2:          Fax 2:
   Past Address 1:     E-mail 1:
   Past Address 2:     E-mail 2:
   City:               Pager 1:
   State:              Pager 2:
   Postal Code:        Other 1
   Country:            Other 2
   Home 1:             Other 3
   Home 2:             Other 4            ⟵ 1110
   Mobile 1:           Class: Friend
   Mobile 2:           Mother's Maiden: Grote ⟵ 1120
   Business 1:         Voice Sample? (Y/N): N ⟵ 1140
   Business 2:         Subscriber Password: Mets ⟵ 1130
```

*FIG. 12*

CLASS AUTHENTICATION

Class 1: Relatives

Password: Grandma is great

Question: Who are Laura's two grandmothers, and what are their maiden names?
Answer: Lee (Maiden name Moore) and Chenzo (Maiden name Raggy)

Class 2: Friends

Password: Hail to the Conquering Heroes

Class 3: Brown Alumni

Verify: https://alumni.brown.edu/online_door.asp

Class 4: Jim Thomas

Question: What elementary school did you attend?
Answer: Brookwood Elementary school

FIG. 13

SUBSCRIBER PERSONAL PROFILE

FIRST NAME: Laura  
MIDDLE NAME: Millhouse  
LAST NAME: Feldman

LISTINGS: Laura Millhouse Feldman  
917-555-4321 (Voice) — 1360

| Identifiers | 1310<br>Disclose | 1320<br>Connect | 1330<br>Day | 1340<br>Time | 1350<br>Unauthorized Message (Voice) |
|---|---|---|---|---|---|
| Class: Relatives; Friends | N | Y | M-F | 6a-7:30a<br>6p-10:30p | Recording 4 |
| Class: Relatives; Friends | N | Y | SA-SU | 9a-11p | Recording 4 |
| Name: Jane Lee | N | Y | 10/28/04 | | Recording 5 |
| Name: Dr. Corey | N | Y | All | All | |
| Class: Unknown | N | N | | | Recording 3 |

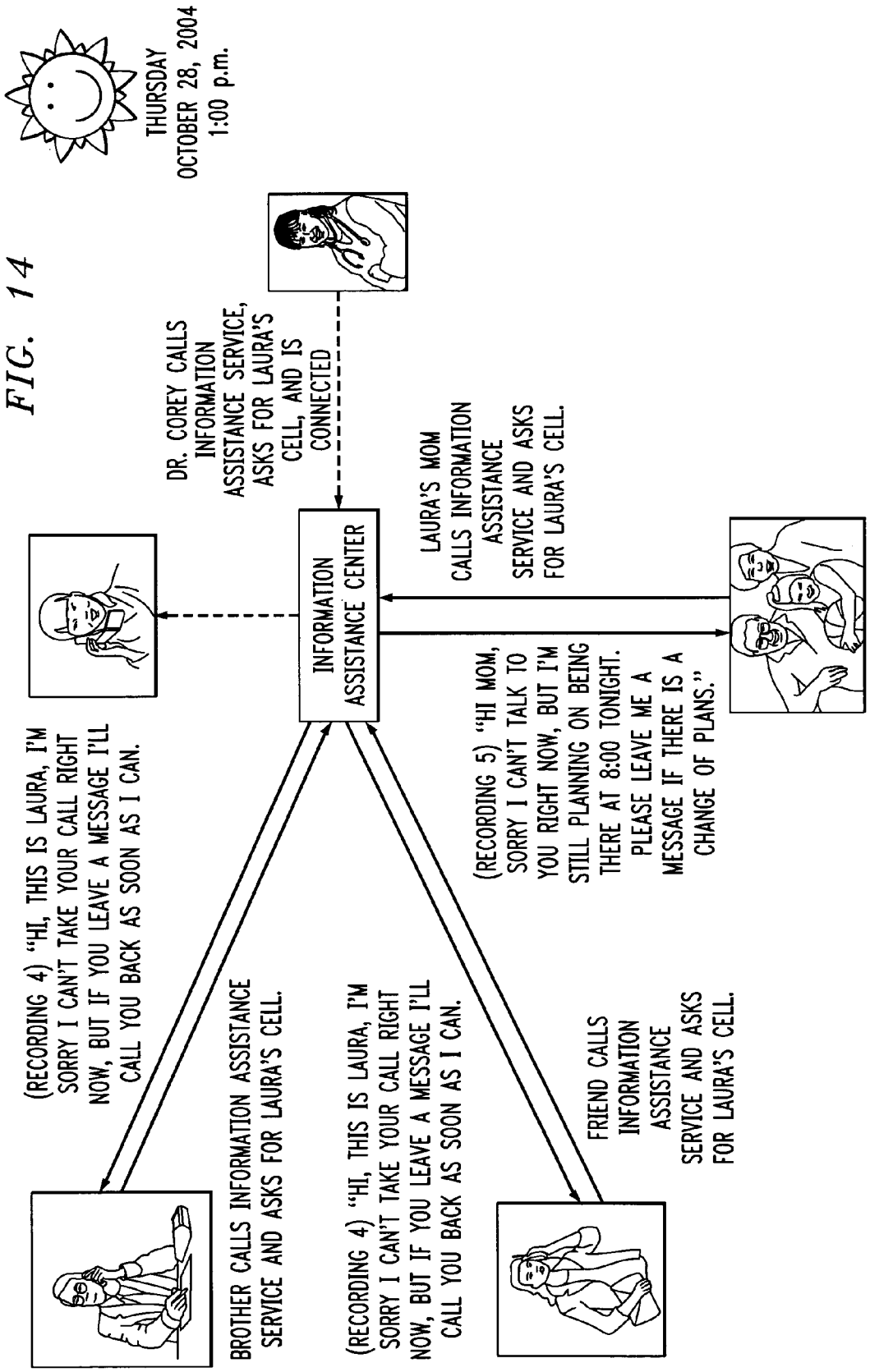

FIG. 16

SUBSCRIBER PERSONAL PROFILE

FIRST NAME [Laura]  MIDDLE NAME [Millhouse]  LAST NAME [Feldman]

LISTINGS: Palm Beach Real Estate

| Identifiers<br>1660<br>Number | 1610<br>Diclose | 1620<br>Connect | 1630<br>Day | 1640<br>Time | 1650<br>Unauthorized<br>Message (Voice) | 1670<br>Subscriber<br>Pays? |
|---|---|---|---|---|---|---|
| Class: All | | | | | | |
| 212-555-7825 | N | Y | M-F | 7:30a-6p | Recording 16 | Y |
| (1) 2125554477<br>(2) 9175554321 (V)<br>(3) 9175554321 (T) | 1) N<br>2) N<br>3) N | 1) Y<br>2) Y<br>3) Y | M-F<br><br>SA-SU | 12a-7:30a<br>6:01p-11:59p<br>All | | Y |

Name: Donald Trump

TECHNIQUE FOR ASSISTING A USER WITH INFORMATION SERVICES AT AN INFORMATION/CALL CENTER

The present application claims, under 35 U.S.C. § 119(e), the benefit of U.S. Provisional Patent Application Ser. No. 60/666,221, filed Mar. 29, 2005, which is incorporated herein by reference. The present application is also a continuation-in-part of U.S. application Ser. No. 10/396,016, filed Mar. 25, 2003 now abandoned; and U.S. application Ser. No. 09/865,230, filed May 25, 2001 now abandoned, both of which are incorporated herein by reference.

FIELD OF THE INVENTION

The invention relates generally to an information assistance system and method. More particularly, the invention relates to systems and methods for providing heretofore unavailable information assistance and connectivity services relating to landline telephone communication, wireless telephone communication, e-mail, text messaging and other forms of communication.

BACKGROUND OF THE INVENTION

Telephone directory assistance services have been available for the past century. While improvements have been made over the decades, such systems are still poorly suited for many users including, for example, subscribers of mobile telephone services (cellular, personal communications services ("PCS") and other wireless services).

In prior art directory assistance services, a customer dials an operator and identifies the name and address of a party whose telephone number is desired. The operator then locates the number, using printed directories or a computer database, and provides the number to the customer. (The provision of the number is sometimes done by a human operator, but more typically is done with a synthesized voice response unit that provides an automated voicing of the number.) After the customer's inquiry has been satisfied, the connection to the operator is terminated.

While satisfactory for most customers, this arrangement is ill-suited for many mobile telephone customers. For one, such customers are usually away from their general work environments (e.g., in a vehicle), and thus may not have ready access to a pencil and paper in order to make a note of the desired number. (Even if such materials are available, the customer may not find it convenient to interrupt other activities, e.g., driving, in order to make a note.) In addition, the process of initiating a second call—to the desired party—entails further manual operations (e.g., hanging up, waiting for another dial tone, and dialing) which may be a hindrance to the customer's other activities.

The present assignee has redressed many of the difficulties associated with providing directory assistance and related services to subscribers of mobile telephone services. For example, it has provided a directory assistance service that eliminates the need to make a note of the desired number, or undertake a redialing exercise. Instead, after determining the telephone number desired by the customer, the directory assistance operator proceeds to initiate a call to the desired party, and connects the new outgoing call to the original customer. This arrangement obviates the need for the customer to make a note of the voiced number, or to undertake a redialing exercise. However, the number can still be voiced to the customer if desired.

Rather than dropping all further involvement with the call, as is typically done with most directory assistance systems, the assignee's directory assistance system continually monitors the connection thereby established for a predetermined command (e.g. a DTMF signal) issued by the customer. For example, the customer may issue a command by pressing the "*" button. If such a command is detected, the customer is transferred to a directory assistance operator, who can then provide whatever further assistance is needed. By this arrangement, the press of a single button by the customer summons further directory assistance, rather than the redialing procedure normally required. One example of such a feature is the assignee's Starback® feature. In addition to (or alternatively to) returning the customer to an operator upon detection of a customer command, the customer can be automatically returned to an operator upon detection of a busy signal, a ring-no-answer condition, a call termination condition or other status condition. One example of such a feature is the assignee's Autoback® feature. Both the return on command and the automatic return are examples of "return to operator" features.

Information assistance services are also very limited with respect to the types of information, connectivity and access that can be provided. For example, as ubiquitous as mobile telephones have become, information assistance services still cannot provide mobile telephone directory assistance, much less directory assistance with respect to other frequently used technologies such as e-mail, instant messaging and text messaging. Moreover, even with respect to traditional landline telephone numbers, commercial directory listing services offer only two classes of residential listings—"listed," which means everyone can have access to the listing all the time, and "unlisted," which means no one can ever have access to the listing.

There are a number of obstacles which confront prospective mobile directory assistance service providers. For example, today, each wireless carrier is responsible for assigning wireless telephone numbers to its subscribers. Therefore, in order to provide a commercially viable wireless directory assistance system, all of the major wireless carriers would have to supply its listings to the service. If a substantial carrier such as Verizon Wireless refused to provide its listings, customers of the wireless directory assistance service would find that an inordinately large number of their calls to the service would not yield the desired number and/or connection. It is unlikely that such a service would stay in business very long. Of course, each wireless carrier can provide a service with its own listings, but this would require customers to know in advance which service provider the person they are trying to reach uses—also a commercially unrealistic requirement.

One reason some wireless service providers refuse to make their numbers available for directory listings is the widespread fear among wireless telephone subscribers that they will be subject to frequent unwelcome interruptions. Unlike landline telephones, wireless telephones are carried everywhere (e.g., to business meetings, ball games, restaurants etc.), increasing the risk of inopportune interruptions by unwelcome callers. Even in the absence of a wireless directory assistance system, this fear has led some consumers to conclude that they actually need two different wireless telephones; one with a freely disseminated number for business, and another telephone for personal use with a number to be given out only to close friends.

A further obstacle to consumer acceptance of a wireless directory assistance solution modeled on traditional landline directory assistance is presented by the fact that, unlike the caller-pays billing model employed by landline telephone services, wireless telephone subscribers are charged for connect time for both incoming and outgoing calls. Therefore, wireless service subscribers who choose to list their phone numbers would be charged for incoming calls they did not want.

Information assistance services have also largely failed to accommodate non-telephone forms of communication, such as e-mail, instant messaging, text messaging, direct connect services (such as that currently offered by Nextel) etc. Traditional directory assistance services, for example, have almost completely ignored these forms of communication. While Internet services such as Yahoo.com and Switchboard.com do offer e-mail search services, it is our experience that such services rarely produce the desired e-mail listings. These services rely in large part on voluntary user registrations and searches of public online records. The online records searched rarely contain the desired listings, and very few users register their e-mail addresses with such services, at least in part because they fear receiving even more unwanted e-mails (including spam, attachments containing viruses etc.) than they already do.

A service called Trekmail (see www.trekmail.com) has been developed in which a person who knows someone else's e-mail address is able to send an e-mail, containing a voice message, to that other person using the e-mail system. The caller sets up a profile with Trekmail, including the caller's name, an account number (user ID), a password or personal identification number (PIN), and a "signature" with which to sign the message. In order to use the service, the caller calls a central Trekmail telephone number (or voice message server) and identifies him- or herself using the account number and password. The Trekmail server, using an interactive voice response (IVR) unit, requests from the caller the e-mail address of the person (the recipient) to whom the caller would like to send a message. The caller then records the message using the telephone, the Trekmail server converts the message to a sound file, attaches the sound file to the e-mail message and sends the e-mail message to the recipient. The e-mail message appears in the recipient's e-mailbox with the caller's return e-mail address and the caller's "signature." In order to hear the message, the recipient opens the e-mail message and the attached sound file.

As noted, however, the Trekmail service requires that the sender already know the e-mail address of the recipient (although recently a capability was added whereby the sender may select an e-mail recipient from a contacts list, the e-mail addresses of all the contacts on the contact list must still be provided by the sender). Another problem with the Trekmail-type messaging system is the difficulty that the IVR has in recognizing the recipient's e-mail address. E-mail addresses come in many forms, and there are many different ways of verbalizing the addresses. For instance, the typical e-mail address "smith@business.com" includes the recipient's name ("smith"), followed by an "at" sign ("@"), followed by the domain name ("business"), a period, and an extension (".com"). The sender likely pronounces the address, "smith at business dot com", and the IVR may be able to recognize it. However, many e-mail addresses differ from this typical address. The recipient's name may include a first initial, e.g., "jsmith," or a first name, e.g., "jaysmith," or may include other punctuation to set off the first name from the last name, e.g., "j.smith," "jay.smith," or "j_smith." When the caller speaks this part of the e-mail address, the IVR cannot distinguish between "jsmith" and "jaysmith," or "j dot smith" and "jay dot smith." The UVR may also encounter confusion if some callers say "jay dot smith" and others say "jay period smith." Similarly confusing words can occur with the domain name, especially since many e-mail addresses have more than one extension, e.g., @business.co.au. The IVR may also have trouble interpreting the words that the speakers say, either because the speakers do not speak clearly or because of the accent or speed with which the address is spoken. Some people may speak the e-mail address using words, and others may spell the whole address out, and others may combine the two methods. In addition, because many parts of e-mail addresses are names and may actually be two or more words concatenated into one, it is difficult to match words using a standard dictionary.

What is needed is an information assistance service that supports directory assistance and connectivity for landline telephones and/or wireless telephones and/or e-mail and/or instant messaging and/or text messaging and/or direct connect services and/or any other communication technologies having connection points expressible as addresses, in such a way that the desired parties can control the information and access afforded to callers and other users who try to reach them.

SUMMARY OF THE INVENTION

In some embodiments, the present invention allows the information assistance provider to act as a directory assistance service for landline telephone listings and/or wireless telephone listings and/or e-mail addresses and/or instant messaging handles and/or text message addresses and/or direct connect numbers and/or other connection points expressible as addresses used in conjunction with any communications technologies. Moreover, in some embodiments, the information assistance provider is used as a conduit for communications between parties. An advantage of some of these embodiments is the ability of a subscriber to define who will receive their connectivity information and/or who will be connected to them, and when.

Strictly by way of example, in one embodiment of the invention, the sending of a message such as an e-mail may be initiated by calling the information assistance (e.g., directory assistance, 411) service provider directly or by transfer thereto as part of another call or series of transactions. The message includes at least first and second portions thereof, e.g., message overhead data versus message content or body. The first portion of the message includes data fields. For example, where the message comprises an e-mail, the message overhead data may include "envelope" information such as the e-mail destination address ("To" data field) and return e-mail address ("From" data field). There may also be other data fields for a carbon copy (CC) address(es), a subject line, a signature, and/or notes for attachment to the message body. In response to a request for sending a message from an information assistance caller, the information assistance service provider obtains first data concerning the first portion of the message, e.g., the message overhead data. The first data is then provided, along with a message identifier, to a message server for sending the message. The information assistance call is then connected to the message server through a network to allow the caller to communicate to the message server second data concerning the second portion of the message, e.g., the message content. The aforementioned message identifier is again provided to the message server in connecting the call to the message server, whereby the message server realizes the message by associating first data and second data based on the same message identifier. Message-identifying data, such as a message ID (distinct from the message identifier), may be added to the first data in order to keep track of the message.

In accordance with an aspect of the invention, part of the message overhead data, e.g., the "To" field, may be obtained from contacts folders (also known as private directories) associated with the caller, which are maintained by the information assistance service provider for the caller. Such contacts folders are identifiable, e.g., by the telephone number of the caller, which appears to the information assistance service provider as an automatic number identification (ANI) when processing the call. Where the data in the "To" field is new, the information assistance service provider may offer to update the appropriate contacts folder(s) with the new destination address. Similarly, the data in the "From" field (a return address) may be obtained from a user profile (e.g. a "personal profile") containing the caller's personal information and preferences, which may also be identified by the ANI.

The invention also includes the ability to facilitate a reply to a message sent using an information assistance service provider. As with the message, the reply also includes first and second portions, e.g., reply overhead data and reply message content. When submitting a request for a reply, message-identifying data are transmitted along with the request so that the information assistance service provider may refer to the original message and the message overhead data associated with that message. The reply may be in the form of a voice call or an electronic reply or a combination of the two. In a manner similar to that for sending a message, the information assistance service provider provides the first reply data and a reply identifier to the message server, and the recipient is connected to the message server through a network to communicate the reply content to the message server. The message server realizes the reply by associating the first and second reply data based on the same reply identifier. In addition, the caller can identify the preferred method of response.

In accordance with another aspect of the invention, information is automatically entered into the data fields of the message. In response to the request for sending a message from an information assistance caller, the information assistance service provider obtains an identifier related to the caller (a "caller identifier"), and then obtains data based upon the caller identifier. This data concerns the first portion of the message, e.g., the data fields of the message overhead data. Part of the message overhead data, e.g., the "To" field, may be obtained from the contacts folders associated with the caller. In addition to being identifiable by the ANI, the contacts folder may be identifiable by a mobile identification number (MIN) if the call comes from a mobile device. The caller (and associated contacts folders) may also be identifiable by a voiceprint or a code provided by the caller. Similarly, the return address (the "From" field) may be obtained from the user profile containing the caller's personal information and preferences, which may also be identified by the ANI or MIN. The profile may also include a history of entries for each data field for that caller, from which the current data field entries may be chosen.

Since all such e-mail and other messages go through the information assistance service, and it is the information assistance service which enters the message overhead data, the invention provides the ability for parties to send messages to and receive messages from others without disclosing their own contact information (e.g. e-mail address). This is a significant improvement over the prior art. When e-mail messages are sent from one user to another today, the return address field of the e-mail message is automatically populated with the sender's return e-mail address so that the receiver can reply to the message. However, once the receiver has the sender's e-mail address, he can contact the sender at his pleasure, and reveal the sender's e-mail address to others, both of which may be undesirable to the sender. One advantage of the instant invention is that it allows e-mail (and similar electronic) communication sessions to occur without requiring either the initiator of the session or the other parties to it to reveal their e-mail addresses.

Note that this aspect of the invention does not require that the initiator of the e-mail (or other similar type of electronic communication technology) session be the subscriber to the information assistance service or that he have a contacts folder or personal profile. For example, the intended recipient of the initial e-mail may have a contacts folder and/or a personal profile, not the sender. Accordingly, if someone wants to send an e-mail to a friend but does not have the friend's e-mail address, he can call the information assistance service and convey his desire to send the e-mail. If the friend has a personal profile containing the friend's e-mail address, the information assistance service can allow the caller to send an e-mail to his friend without ever revealing the friend's e-mail address to the caller. Whether or not such contact should be permitted may also be defined in the friend's personal profile. As such, the information assistance service can act as an e-mail directory assistance service, while at the same time providing access to and information about a subscriber (be it a paying or non-paying subscriber) according to the subscriber's wishes as defined in his personal profile.

Of course, the attempt to send an e-mail through the information assistance service to a desired party does not have to be initiated by telephone communication with the information assistance service. Instead, the request can itself be initiated electronically, such as by sending an e-mail to the information assistance service substantially in the form of the e-mail intended for the recipient. In addition, the information assistance service can be used as a directory assistance provider and/or communications conduit for telephone communications (landline, wireless, VoIP etc.) and/or any other communication technologies having connection points expressible as addresses as well, with users having the same level of control over connectivity and/or the disclosure of telephone numbers or other addresses.

A further aspect of the invention is the ability to use Starback®-type features, which allow a caller to connect to a destination terminal (e.g., the aforementioned message server), thereby disconnecting the caller from the information assistance service provider, and yet be able to summon the service provider for further assistance by initiating a predetermined signal by pressing, e.g., the "*" (star) key on a telephonic device.

A further aspect of the invention is the ability to use an Autoback® feature, which reconnects the caller to the information assistance service provider if an attempted call to a destination party cannot be completed, e.g., if there is a busy signal, a ring-no-answer condition, a call termination condition, a network communication problem or other detectable status condition.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

FIG. 1 illustrates an arrangement for sending a message using an information assistance service provider in accordance with an embodiment of the present invention;

FIGS. 2A-2C are examples of message data entry templates as viewed by an information assistance service provider in accordance with an embodiment of the present invention;

FIG. 9 illustrates an example of a subscriber's contact preferences with respect to one of her e-mail addresses in accordance with an embodiment of the present invention;

FIG. 10 illustrates an example of an interface for sending an e-mail to a subscriber through an information assistance service web page in accordance with an embodiment of the present invention;

FIGS. 11A-11C illustrate examples of entries in a subscriber's contacts folder in accordance with an embodiment of the present invention;

FIG. 12 illustrates examples of a subscriber's class authentication criteria in accordance with an embodiment of the present invention;

FIG. 13 illustrates an example of a subscriber's contact preferences with respect to voice communication on a mobile device in accordance with an embodiment of the present invention;

FIGS. 14 and 15 illustrate how certain callers will be treated by the information assistance system pursuant to the subscriber preferences shown in FIG. 13;

FIG. 16 illustrates an example of a subscriber's contact preferences respecting a business listing with which she is associated in accordance with an embodiment of the present invention.

DETAILED DESCRIPTION

Figure 2B:
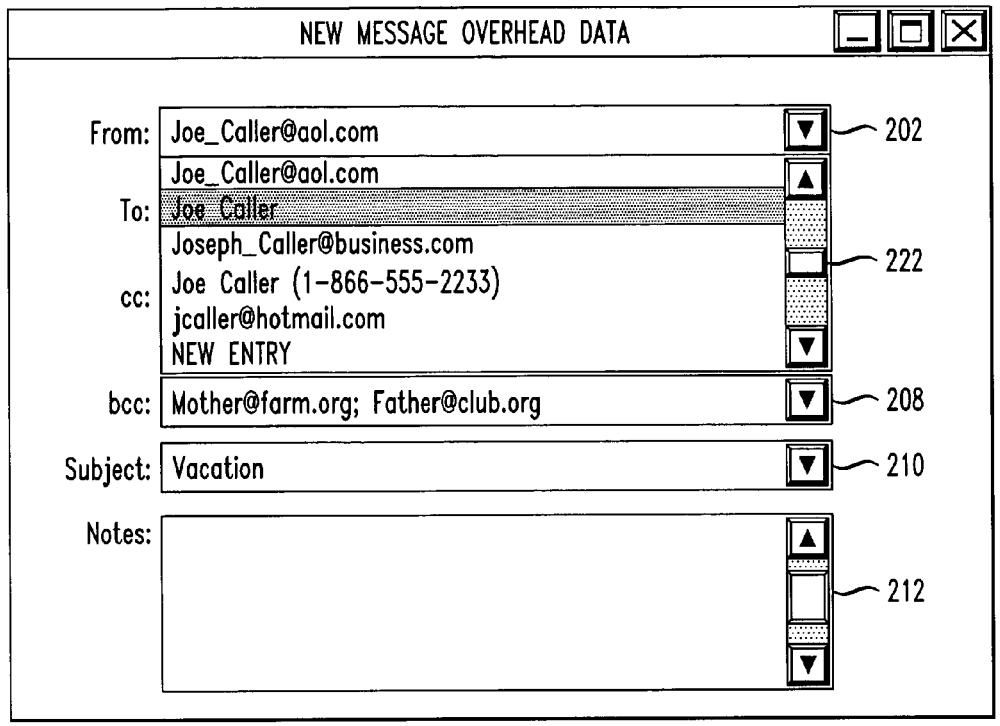

FIG. 1 illustrates arrangement 100 in which a caller initiates an information assistance call from caller terminal 10, which is routed to, say, information/call center 110 via one or more carrier switches in a carrier network, e.g., a public switched telephone network (PSTN), a wireless telephone network, etc. Caller terminal 10 may comprise a wireless telephone, wireline telephone, personal digital assistant (PDA), computer, or other communication device. In a typical directory assistance call, a caller identifies to the operator the name and address (sometimes city or area code) of a party whose telephone number is desired. In response, the operator locates the desired destination telephone number using, e.g., a computer database. The destination number is then provided to the caller, e.g., by a computerized voice server which provides automated voicing of the number, and the caller is afforded an option to be connected to the destination number without the need of first terminating the directory assistance call.

Information assistance is an extension of directory assistance. In addition to connecting a caller to a destination number, information assistance operators can provide concierge-type services such as a restaurant guide and reservation service, event ticketing and reservation service, hotel reservation and availability service, travel or flight reservation and ticketing services, ordering specific items such as flowers or food delivery, arranging transportation, and accessing entertainment guides. The use of information assistance to provide such concierge-type services is disclosed, e.g., in co-pending, commonly-assigned application Ser. No. 09/520,306, "Technique for Providing Information Assistance Including Concierge-Type Services," filed Mar. 7, 2000, which is incorporated herein by reference. The term "operator" used herein broadly encompasses entities that are capable of providing information assistance in a telecommunications environment, including, without limitation, human operators, voice response/recognition capabilities, web-/WAP-enabled operator services, and other automated and electronic access.

In addition, a caller who subscribes to an information assistance service may have one or more user profiles on file with the service that include information pertaining to and about the caller, including his/her preferences. Such preferences may specify use of a special skilled operator to answer the caller's call, and include such personal information as favorable restaurants, movies, sporting events, or hobbies. They may also define options of various assistance service features which may include, e.g., the above-described concierge-type features whereby the user can make restaurant reservations, purchase tickets, etc.; a second feature whereby the user is provided with a listing number before he/she is connected to the listing number; and a third feature whereby the user can obtain directions to a listing address. Similarly, for example, the methods of delivery (e.g., e-mail, paging, short message service (SMS), etc.) of (i) a confirmation of a reservation or purchase, (ii) a listing number, and (iii) directions to the user may be specified in the user profile as well. The user profile(s) in one instance is maintained in association with, and is identifiable by, the caller's telephone number.

The caller may also subscribe to a personalized information management service as part of the information assistance service described, e.g., in U.S. Pub. No. 2002/0055351 A1, published May 9, 2002, incorporated herein by reference. For example, the information management service maintains for the caller contacts folders (also known as private directories), appointments folders, to-do lists, etc. The caller may access, through the information assistance service, contact information, appointment information or a to-do list item in the respective folders associated with the caller or his/her telephone number. In particular, a contacts folder contains contact information, such as a telephone number(s), an address (es), and e-mail address(es), for people and/or organizations. A user may have separate contacts folders for different purposes, such as a personal contacts folder, business contacts folder, sports team contacts folder, etc. An appointments folder contains a user's appointment and/or calendar information, and a user may similarly have separate appointments folders for different purposes. Other folders may include events, products, and other information that may be tailored to the needs of an individual or a group, e.g., a corporation, an organization, or a collection of people having a common interest. These folders may be identified by the user's telephone number, and are accessible by each information assistance operator through personal information servers 150. The user may have specific rights with respect to a folder, e.g., owner, administrator, read-only, etc. When the user accesses a folder through the operator, the operator in some embodiments becomes an alter ego of the user and is subject to the same rights as the user with respect to the folder. The user may create, maintain, or access a contacts, appointments, or other folder via the Internet or other communications means, or through an operator who in turn may create, maintain, or access the folder on behalf of the user. If using an operator, the user calls a designated access number, and the call is routed to an information/call center 110 where an operator attends to the call. While or before the user communicates to the operator his/her needs, the operator accesses one or more personalized information servers 150 through communications network 160, e.g., a wide area network (WAN) or the Internet. In response, server 150 presents on the operator's terminal various graphical user interface (GUI) dialog boxes, e.g., "login" (for confirming the user's identity by User ID and password), "home" (listing the user's contacts, appointments, and other folders), "edit" (for editing specific folder contents), and "view" (for viewing folder contents), for interacting with the operator.

The present invention is in some aspects directed to providing an information assistance service to assist a user in communicating with a desired party while at the same time providing the user and/or the desired party with the level of privacy desired. The desired party may be identified by name, but may also be identified by an e-mail address or addresses associated with other messaging systems, including a telephone, wireless telephone, pager, SMS, personal digital assistant (PDA), personal information management (PIM) system, etc.

In one illustrative embodiment in which users can e-mail voice messages to desired recipients, users of a particular telephone carrier may dial, speak or otherwise communicate predetermined access digits, access codes or retail numbers, or input a predetermined address or URL (uniform resource locator) established by the carrier to access information/call center 110. For example, the predetermined access digits may be "411," "*555," "555-1212," "00," etc. On learning one such access digit sequence initiated from a caller's communications device, a switching system of the caller's telephone carrier in a conventional manner routes the information assistance call to information assistance service provider 140 through a carrier network. In this instance, the carrier network switches the call to servicing platform 130, which is associated with service provider 140. Once connected to information/call center 110, the caller indicates to service provider 140 his or her desire to send a message to a destination, which can be associated with any entity, e.g., a person, a business, an organization, etc., that is accessible via a messaging system. In accordance with an aspect of the invention, service provider 140 determines "message overhead" data, as distinguished from the message content or body information. Such message overhead data may include "envelope" information data fields such as the destination address(es) (e.g., e-mail address) to which the message is to be delivered (the "To" field), destination name, sender's name and return address (e.g., return e-mail address or "From" field). Message overhead data may also include data fields for a carbon copy (CC) and/or a blind carbon copy (BCC) address(es), a subject line, a signature, and/or notes for attachment to the message body. A message may be sent using "indirect addressing," in which the address name stays the same, but the person or persons covered by the address may differ, for example when a destination address includes a mailing list whose contents may change from day-to-day (e.g., "sales force"). In order to track the message, service provider 140 generates message-identifying data or a message ID and includes it as part of the message overhead data. The message ID is used for identifying the message and may be unique, although such uniqueness is not required so long as the message ID combined with other message overhead data uniquely identifies the message. The message overhead data as determined are transmitted to one or more message servers 120 through communications network 160. In addition, service provider 140 routes the caller's call via carrier network 180 (e.g., PSTN), comprising one or more switches, trunks, and central and end offices, to message servers 120 for the caller to communicate thereto the message content to complete the message. As an example, message server 120 may comprise the prior art Trekmail server described before. Message server 120 in a conventional manner sends the complete message (i.e., the message overhead data plus message content) to one or more appropriate destinations 20. Depending on the destination address used, the message may be sent over a communications network or a carrier network or some combination of the two. This carrier network and communications network may be the same as or different from carrier network 180 and communications network 160.

There are several ways to determine the return and destination addresses. One is for the caller to provide the exact addresses to service provider 140. In the case of an e-mail address, the caller may pronounce the address in words or spell it out, so that an operator in service provider 140 is able to transcribe the address.

Another way is more automatic. When the information assistance call is received by servicing platform 130, the latter in a well-known manner derives, from the signaling associated with the call, the caller's telephone number from which the call originates, also known as an ANI (automatic number identification) (or an MIN (mobile identification number) if the call originates from a mobile number). Alternatively, the caller may be identified by the caller's name, telephone number, a code provided by the caller, by the caller's voiceprint, or by other means. If the caller is a subscriber to the aforementioned personalized information management service, the operator's terminal screen will attempt to automatically populate the return and destination address fields based on information in the caller's contacts folder and/or personal profile. Like the contacts folders, the user profile in this instance is identifiable by the ANI, and can be retrieved in a manner described below.

There are a number of ways for the automatic field population to work. One is to automatically populate each data field with the last entry used. Past entries may be recorded by the information assistance service center and may be kept in the caller's profile. Data sources may be specified in a Personal Profile. If the profile keeps track of the frequency of past-used entries, another method is to automatically input the entry that has been used most in the past for that data field. Variations to this latter method may determine frequency based on the time of day or the ANI from which the caller is calling. If the call occurs during the day, there may be one set of entries more frequently used during working hours, for instance, whereas during the evening, more personal entries may be used. Similarly, if the ANI is associated with the caller's workplace, then a work-related entry would automatically populate the field rather than a more personal entry, which might be used if the ANI is associated with the caller's home.

These methods are illustrated in FIG. 2A, which shows a template on a terminal screen for use by the information assistance service provider in entering message overhead data. Boxes 202-214 are message data fields indicating return, destination, CC, and BCC addresses, as well as subject, notes, and signature fields. These fields are automatically populated with, as shown in this example, the entries used in the previous message sent by the fictional user, "Joe Caller." Alternatively, as mentioned above, each field may be automatically populated with the entry most frequently used by the caller. The operator can read to the caller the entries that have been automatically entered. If any entry is not what the caller desires, the caller indicates which field or fields should be changed. If the return address ("From" field) is incorrect, the operator can click, with a mouse or other similar pointing device, on the arrow on the data field box (dialog box) containing the field entry and activate drop-down box 222, as shown in FIG. 2B. Here, drop-down box 222 includes alternative entries for the return address field. They may be organized in a number of ways: most recently used, most frequently used, alphabetical, etc. The last entry may be called "NEW ENTRY," which can be used by the operator to begin typing a different entry provided by the caller. In the example in FIG. 2B, the different return addresses may indicate the possible reply-to addresses used by the caller, depending on how the caller wants to present him- or herself to the recipient. If the caller is sending a personal e-mail, the caller's name or a personal return address may be used (e.g., Joe_Caller@aol.com), whereas if the caller is sending a business-related e-mail, a work address may be used (e.g., Joseph_Caller@business.com). In addition, because the message is being sent using the information assistance service provider, the caller's return address can be anonymous (e.g., Joe Caller), with replies being sent to the information assistance service provider rather than directly to the caller.

Figure 2C:
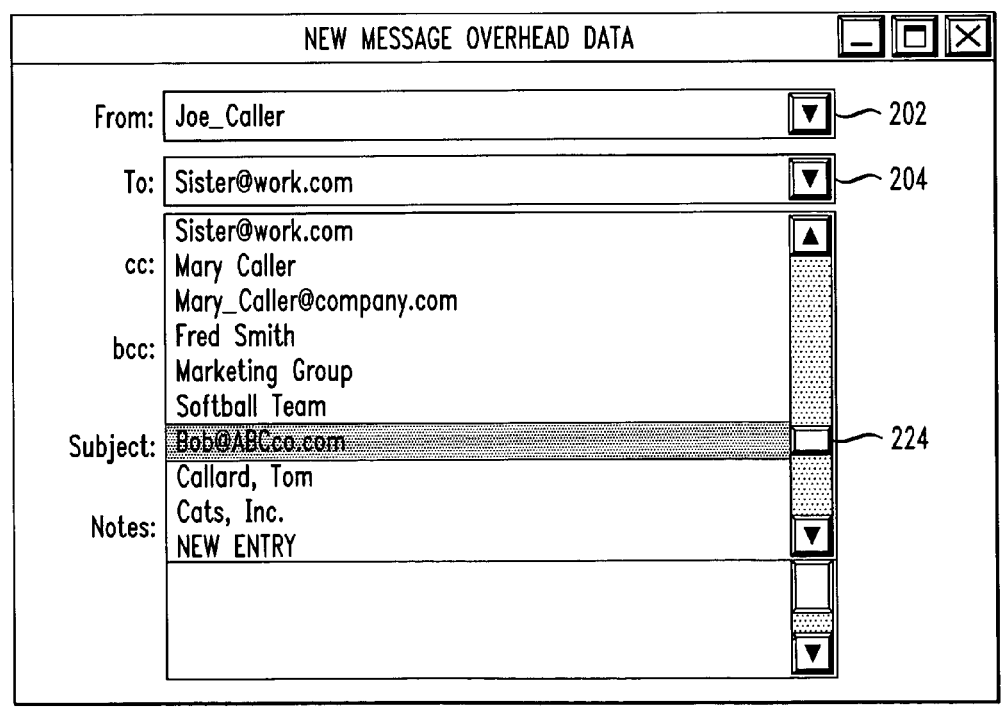

Similarly, if the destination address ("To" field) is incorrect, the operator can activate drop-down box 224, as shown in FIG. 2C. Drop-down box 224 illustratively includes alternative entries for the destination address field, ordered by recent use, frequency of use, alphabet, or a combination of these. For example, drop-down box 224 may first include the five most frequently used entries, and below that may list alphabetically the entries from the caller's contacts folders. Thus, the caller may communicate to the operator that he/she wants to send an e-mail to a destination party, e.g., Bob at ABC Company. In response, the operator searches drop-down box 224 for the desired contact information, including, e.g., Bob's e-mail address in this instance (Bob@ABCco.com). The operator can read back the likely address, and, upon confirmation by the caller, can accept the address by clicking on it. If none of the entries listed is what the caller desires, the operator can choose "NEW ENTRY," automatically blanking field 204, and begin typing a different entry provided by the caller. As the operator begins to type the new entry, the field accesses lookup tables and performs "auto completion," which tries to automatically complete the entry. The lookup tables can include addresses from the caller's profile and contacts folders, as well as public databases, e.g., public e-mail address directories, accessible to the information assistance service center. Such databases may be standalone (e.g., on CD-ROM) or may be accessible via the Internet or other public or private network. While typing, the system provides auto completion possibilities to minimize the amount of typing performed by the operator. In addition, once the address is entered and confirmed, the operator can add to the appropriate contacts folder that destination name and address as new contact information.

As mentioned before, the destination address is part of the message overhead data. Other message overhead data may include CC and BCC addresses, a subject concerning the message to be sent, notes, and a signature. Each of these fields may be automatically populated in the manner used for the return and destination addresses. The automatic entry for different fields may be based on different criteria—e.g., most recently used for addresses, most frequently used for subject, etc. If the initial automatic entries are not correct, the operator may click on the drop-down lists to choose other entries, or type new entries whose entry into the data fields may be facilitated using auto completion. Similarly, the caller's signature, which may include the caller's name and/or a stylized signature representing the caller and which may be stored in the user profile as well, is automatically entered according to a preferred criterion (e.g., last used, default, most frequently used), but other choices may be made, depending on the type of message sent and the caller's preferences.

Automatically entering data is advantageous because there is less typing for the operator to do. This results in less time spent by the operator servicing the call. Less typing also results in fewer typing mistakes made. In addition, by using entries retrieved from past usage, the entries (such as e-mail addresses) are more reliable, having already been demonstrated to work (assuming the message was not returned as undeliverable).

Figure 3:
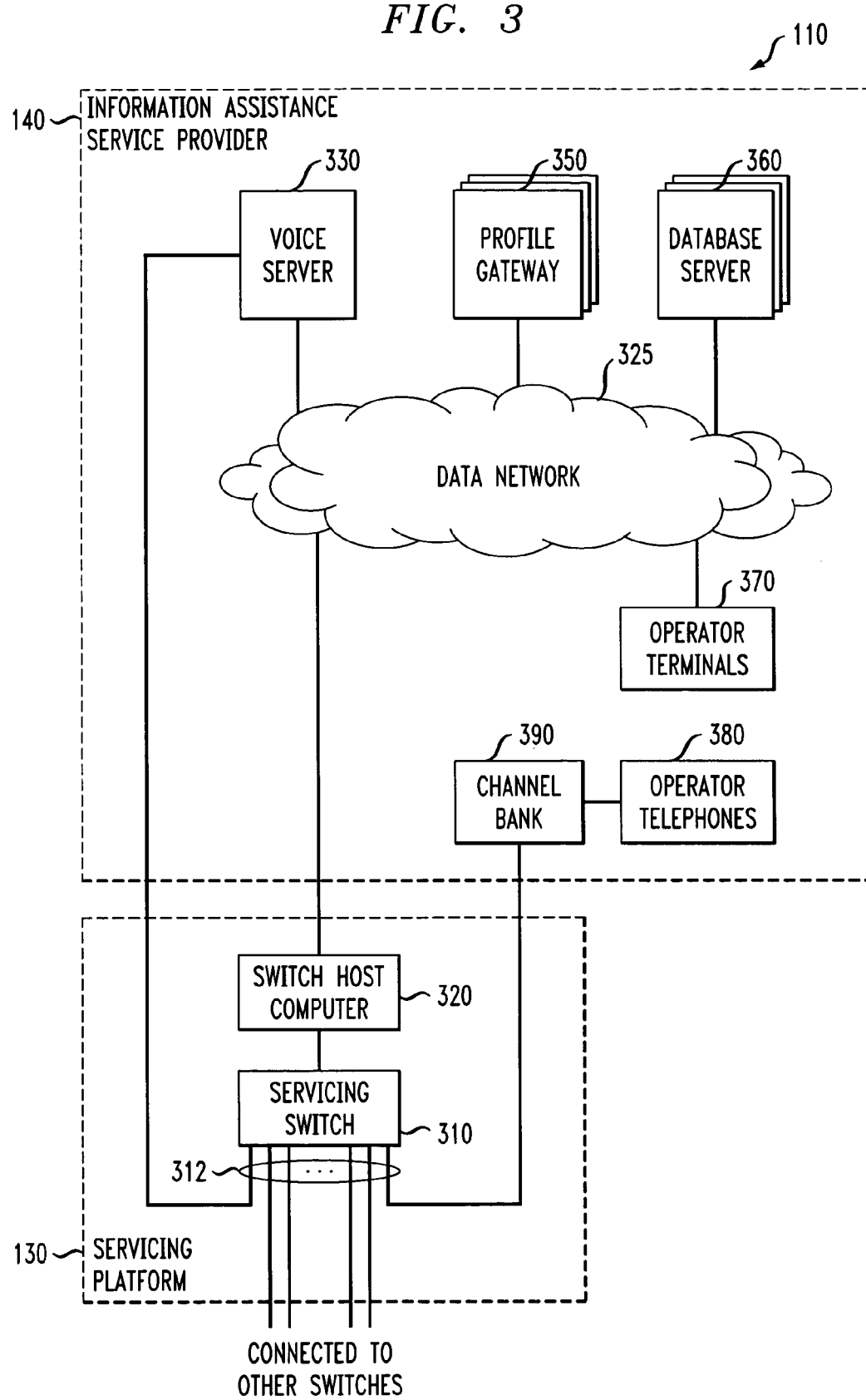
FIG. 3 illustrates an information assistance service provider and a servicing platform for providing an information assistance service.

FIG. 3 illustrates information/call center 110, which may be configured to include information assistance service provider 140 together with servicing platform 130. It should be noted that even though both service provider 140 and servicing platform 130 appear in the same figure, they may or may not be located in the same geographic area. Servicing platform 130 includes servicing switch 310 having T1 spans 312 for connection to voice server 330, channel bank 390, and one or more carrier networks. In an alternative embodiment, voice information may be packetized and transmitted pursuant to a voice over Internet protocol (VoIP) through a packet-switched network, e.g., the Internet, to information/call center 110. Servicing switch 310 may receive an incoming information assistance call from a carrier switch in a carrier network. Servicing switch 310 may also be used to place an outgoing call onto a carrier network, which may be different from the carrier network used for the incoming call.

Channel bank 390 in service provider 140 is used to couple multiple operator telephones 380 to servicing switch 310. The operators in information/call center 110 are further equipped with operator terminals 370, each of which includes a video display unit and a keyboard with an associated dialing pad. Operator terminals 370 are connected over data network 325 to one or more database servers 360, switch host computer 320, personalized information servers 150, etc. Switch host computer 320 and voice server 330 are also connected to data network 325. By way of example, data network 325 includes a local area network (LAN) supplemented by a number of point-to-point data links. Through data network 325 and routers (not shown), components of information/call center 110 are also connected to communications network 160.

Servicing switch 310 is conventional and supports digital T1 connectivity. The operation of servicing switch 310 is governed by instructions stored in switch host computer 320. In this illustrative embodiment, servicing switch 310 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 110 and servicing switch 310 for each corresponding function.

An incoming information assistance call is received by servicing switch 310 in information/call center 110, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 320 or elsewhere in information/call center 110. In other instances, other distribution logic may be utilized, such as skills-based routing or a priority scheme for preferred users.

Operators may use database server 360 to provide information assistance including searching internal and external databases (including those accessible via the Internet) for a user's desired party and determining the appropriate destination address of the party.

Voice server 330 (also known as a "voice response unit" or "VRU") is used to play the constant repeated parts of an operator's speech, namely, the various greetings and signoffs (or closings). Voice server 330 is connected via data network 325 to switch host computer 320 and via one or more T1 spans 312 to servicing switch 310. Voice server 330 may comprise a general-purpose computer and one or more voice cards for voice recognition, voice recording and playback, and call progress analysis. At appropriate stages in a call progression, switch host computer 320 initiates a voice path connection between voice server 330 and servicing switch 310 such that the user, or the user and the operator, are able to hear whatever pre-recorded speech is played on that connection by voice server 330. Computer 320 then instructs voice server 330, via data network 325, what type of message to play, and passes data parameters that enable voice server 330 to locate the message appropriate to the call state.

Data network 325 may further connect to one or more profile gateways 350. Each profile gateway 350 provides access to a user profile, which may include personal information and the subscriber's preferences. Such personal information and preferences may include the subscriber phone number, fax number, e-mail address, preferred restaurant and dining time, preferred mode of delivery of information to him/her, dietary requirements, likes and dislikes, past logged activities, etc. When the information assistance call is received by servicing switch 310 in information/call center 110, switch 310 derives, in a well-known manner, from the call setup signaling associated with the call the aforementioned ANI, i.e., the telephone number from which the call originates. Switch host computer 320 then requests via a profile gateway 350 any profile identified by such an ANI. An embodiment of profile gateway 350 may include a data network interface, a communications interface, a processor, and memory. Profile data may be input and updated (e.g., via Internet web pages or operator) through a remote profile manager (not shown). Copies of the profile data are distributed to the profile gateways in various information/call centers (e.g., center 110) connected via communications network 160. In response to a request for a profile, the processor in the profile gateway searches the memory (which may include disks, caches, and volatile and nonvolatile memories) for the profile identified by the ANI. When the operator answers the call, computer 320 communicates to components in service provider 140 and, in particular, the operator through terminal 370 any profile data pertinent to the handling of the call. In this instance, the caller requests the operator's assistance to send a message, e.g., an e-mail message, to a desired destination. In response, the operator brings up on terminal 370 template 200 to collect the message overhead data as described before. User profile data, such as the caller's e-mail address, signature, etc., and previous destination, CC, and BCC addresses and subjects and notes may populate the template automatically, thereby minimizing the need for interrogation and transcription by the operator. In addition, as described before, the template may be populated with other possible destination e-mail addresses from the caller's contacts folders identified by the ANI, and/or other resources, and the operator obtains from the caller the desired address. Also as described before, the caller's choice of return address can reflect the caller's desired method of reply. Such information includes a reply-to address or telephone number as well as whether replies should be directed to the caller directly or to the service provider (in order to maintain anonymity). Reply information that the caller permits the recipient to view is included as part of message overhead data. Information the caller would like to remain hidden from the recipient (such as the caller's e-mail address or telephone number) may be provided to the service provider and/or placed in the caller's profile, and it is retained by the service provider for relaying replies.

Referring to FIG. 1 once the message overhead data are collected, the operator causes the data, formatted in accordance with a predetermined protocol, to be transmitted to a message server 120 through communications network 160. In this instance, the ANI associated with call terminal 10 is added to the message overhead data for its identification. The operator also causes the caller's call to be connected to a message server 120 through carrier network 180, thereby disconnecting the call from service provider 140. Host computer 320 is programmed to insert the ANI previously determined thereby in the call setup signals for establishing the caller's connection to message server 120 through servicing switch 310. In this instance, message server 120 relies on the ANI (or other identification mechanism) inserted in the call setup signals to locate the previously received message overhead data concerning the caller's message, which is identifiable by the same ANI. After the caller communicates the message content through the established connection to server 120, the latter integrates such message content with the identified message overhead data, thereby realizing a complete message to be sent. The message content may contain multimedia (e.g., audio, video and/or text) information, depending on the capability of terminal 10 used by the caller, and the media supported by server 120.

Figure 4A:
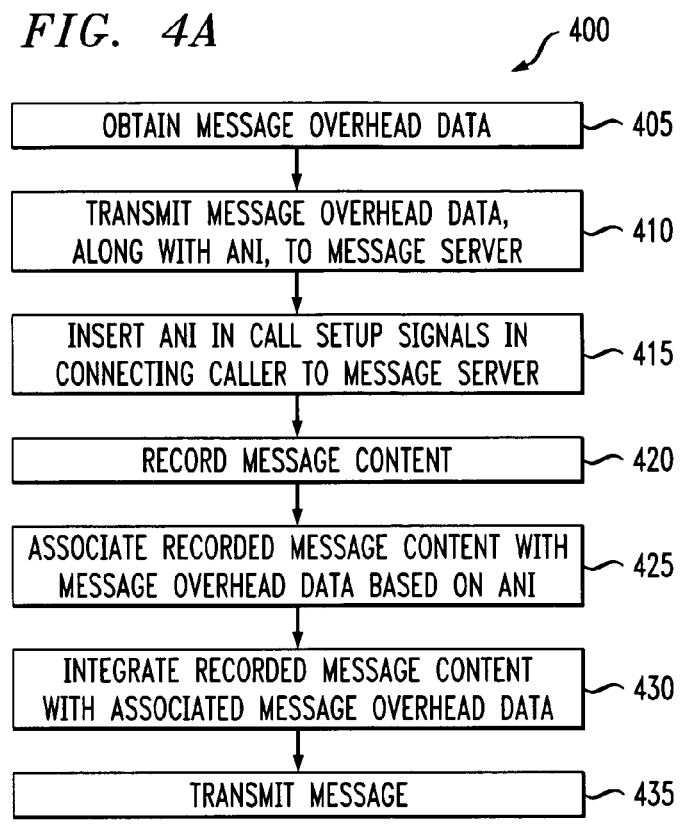
FIG. 4A is a flowchart depicting a routine for sending a message to a destination in accordance with an embodiment of the present invention.

FIG. 4A is a flowchart 400 illustrating a routine for sending a message to a desired destination using an information assistance service in accordance with an embodiment of the present invention. The caller initiates an information assistance call from caller terminal 110, connected to information/call center 110. Service provider 140 obtains message overhead data in step 405. Once the message overhead data is obtained, service provider 140 in step 410 transmits the data, along with the ANI (or other identification means) associated with terminal 10, to message server 120.

In step 415, the operator connects caller terminal 10 to a message server 120 through servicing switch 130, and in establishing the connection to message server 120, host computer 320 inserts the ANI associated with terminal 10 in the call setup signals as mentioned before. As a result, service provider 140 in this instance is disconnected from terminal 10. However, one or more DSPs in servicing switch 310 may be programmed to detect any predetermined signals generated by the caller on the connection between caller terminal 10 and servicing switch 320. For example, the DSPs may be programmed to monitor the connection for particular DTMF signals (e.g., "*" key) or other signals (e.g., speech) to implement a Starback® feature disclosed, e.g., in U.S. Pat. No. 5,797,092, hereby incorporated by reference. For example, the Starback® feature allows the caller to be reconnected to service provider 140 for further information assistance upon pressing a "*" (star) key on terminal 1.0.

In step 420, message server 120 prompts the caller to record the message content. For a voice message, this may be done in the manner described above with respect to the Trekmail system. For a video message, the caller may have a videophone or a camera, such as a "web cam," that takes video pictures of the caller with or without sound. These video pictures may be transmitted directly over the phone connections to message server 120 or may be converted to a video file and then transmitted over the phone connections to message server 120. For a text message, a user may use a well-known text input device to enter and transmit the message over the phone connections. Alternatively, the caller may dictate a message to the operator before being connected to message server 120, and that dictated message could be transmitted to message server 120 along with the message overhead data obtained in step 410. Another method of transmitting a text message is to use a speech-to-text converter in message server 120, which converts the caller's speech into a text message. A message may include more than one kind of message format (e.g., audio and text).

In step 425, message server 120 in this illustrative embodiment relies on the received ANI in the call setup signals to associate the recorded message content with the previously received message overhead data identified by the same ANI, i.e., the ANI associated with terminal 10. However, in an alternative embodiment where communications are in accordance with the VoIP, both the message content and message overhead data traverse the same communications network 160 in the form of data packets identifiable by the IP address of terminal 10. As a result, in the alternative embodiment carrier network 180 and the aforementioned ANI are not needed.

In step 430, message server 120 integrates the recorded message content with the associated message overhead data, thereby realizing a complete message to be sent. In step 435, message server 120 transmits the message to the destination address indicated in the message overhead data. If the destination address is an e-mail address, the message server may deliver the message over a communications network.

Figure 4B:
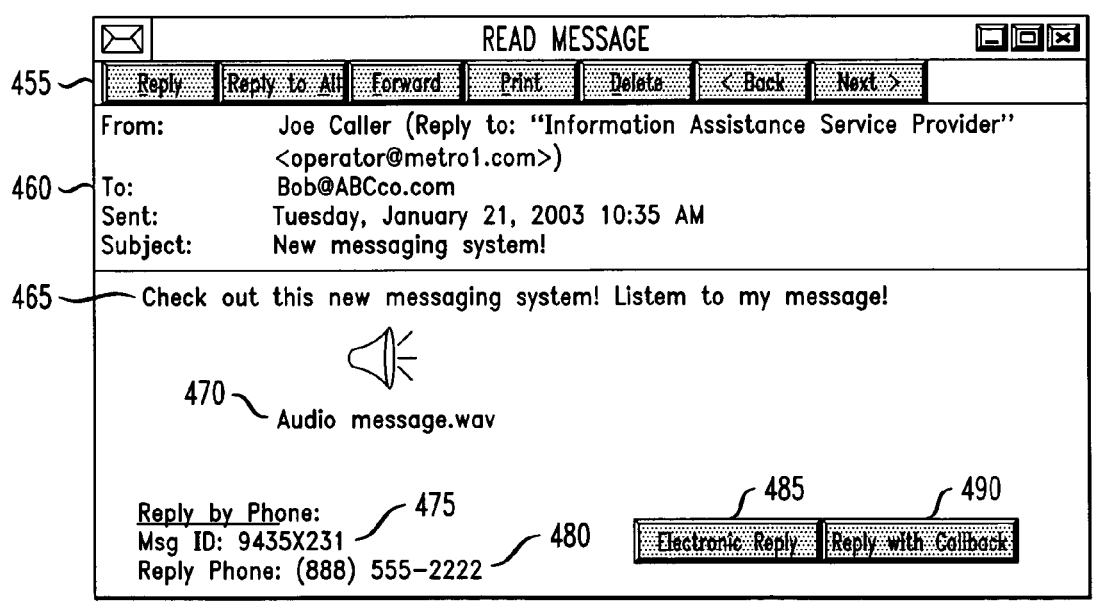
FIG. 4B is an example of a message as viewed by the recipient in accordance with an embodiment of the present invention.

FIG. 4B is an example of a message 450 formed in accordance with the invention, as viewed by the recipient in an e-mail format. The recipient is shown in block 460 along with the sender's name, a "reply-to" address, the date the message was sent by message server 120, and the subject. In this case, the sender has chosen not to provide a return e-mail address or telephone number, so information assistance service provider 140 provides the reply address in the "From" field. The date is generated in a conventional manner by the e-mail system when the message is sent by message server 120.

Message body 470 in this example contains an audio message, recorded by the sender after he or she was connected to a message server 120. Notes 465 could have been included as part of the message overhead data (and thus obtained by service provider 140) or could be included as part of message body 470 (and thus obtained by message server 120) as previously described.

Message ID 475, reply phone number 480, electronic reply button 485, and reply with callback button 490 are displayed at the end of message and are included in order to facilitate a reply, the mechanics of which are described below.

Figure 5A:
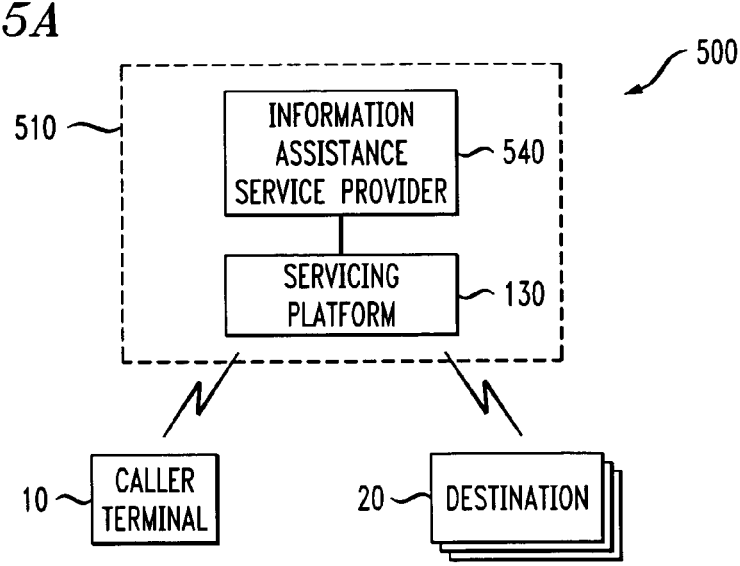
FIGS. 5A and 5B jointly illustrate another arrangement for sending a message using an information assistance service provider in accordance with an embodiment of the present invention.
Figure 5B:
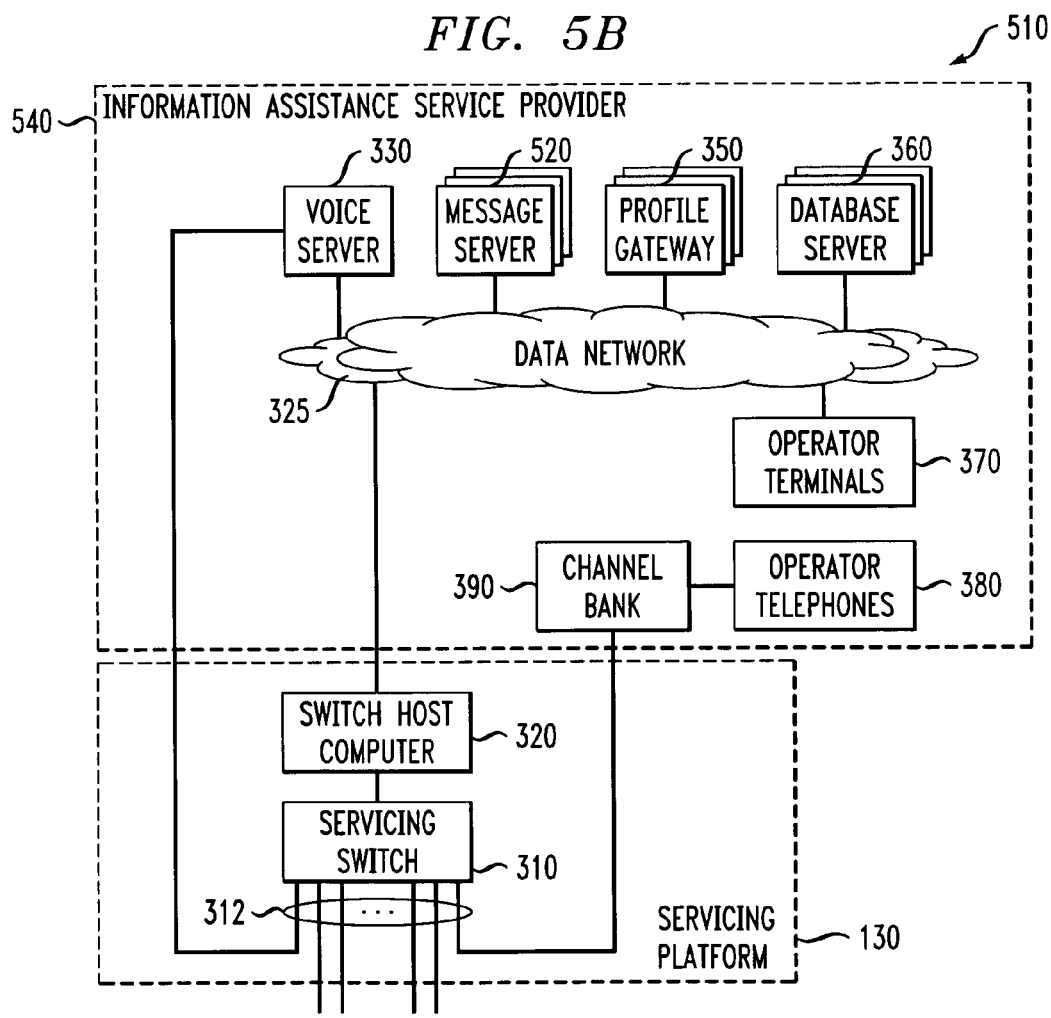

FIGS. 5A and 5B jointly illustrate a second arrangement denoted 500 in accordance with the invention. In this second arrangement, the message server is made part of information/call center 510, which is similar to information/call center 110 except for the additional message servers 520 internal to information assistance service provider 540. When a caller in this instance makes a call requesting to send a message to a desired destination, the operator provides to a message server 520 the message overhead data, which the caller may furnish or which the operator may find in the caller's contacts folders, profiles or other internal or external databases. The caller is then prompted by message server 520 to record the message content to complete the message. In a conventional manner, the completed message is sent to the desired destination indicated in the message overhead data. Thus, in arrangement 500, use of internal message servers 520 obviate the need for exporting any message overhead data to an external message server or transferring the caller's call to the same.

Figure 6A:
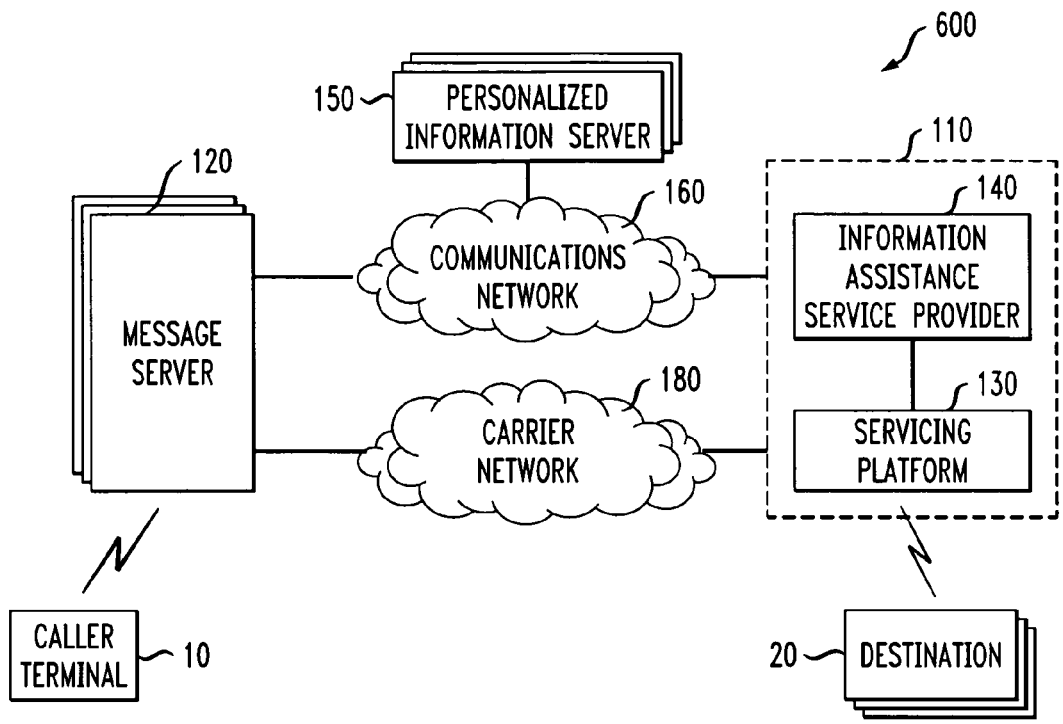
FIGS. 6A and 6B illustrate an arrangement and a flowchart for replying to a message using an information assistance service provider in accordance with an embodiment of the present invention.
Figure 6B:
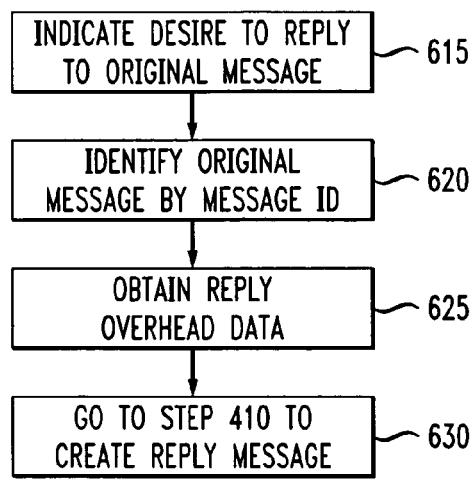

The invention also includes facilitating a reply to be made to the message. FIG. 6A illustrates one such arrangement 600 and FIG. 6B is the accompanying flowchart 610. (Note that arrangement 600 may also be arranged as in FIGS. 5A and 5B, in which the message server is integrated with the information assistance service provider.) Illustratively, the recipient may reply to the message by phone, electronically, or by a combination of these methods. In addition, the sender may identify the preferred method of response.

In each of these methods, the recipient indicates in step 615 the desire to reply to the original message. The original message is then identified by its message ID in step 620. "Reply overhead data," analogous to message overhead data, are then obtained in step 625. The steps shown in flowchart 400 are then followed to complete the reply.

More specifically, replying by phone involves calling reply phone number 480. Depending on the sender's preferences, reply phone number 480 is linked to service provider 140 and may be a toll-free number (as indicated in FIG. 4B). Once connected to service provider 140, the recipient provides the message ID, and service provider 140 accesses the message overhead data from the sent message, including the sender's destination address to where the reply should be sent. Given the message ID, service provider 140 is also able to access from a message server 120 the original message content itself. From this point, the procedure for sending a reply is similar to that for sending an original message. Service provider 140 obtains the requisite reply overhead data from a number of sources, e.g., the sent message, the recipient, and/or the recipient's profile (if available). (For example, the recipient may want to use as a reply-to address the same address used by the sender as a destination address.) These values are automatically entered into a reply message overhead data template in a manner analogous to that used for the original message overhead data. Reply overhead data include the same types of information as message overhead data, including a reply message ID. Because service provider 140 can access the original message from a message server 120, reply overhead data may also include the original message. Alternatively, the original message may be appended to the reply message by message server 120. As with the original message, the reply overhead data are transmitted with the recipient's ANI (as a message identifier) to a message server 120, and then the recipient is connected to the message server to record the reply. Once the reply is recorded, it is associated with the reply overhead data and the content and overhead data are integrated into a complete reply, which is transmitted to the sender.

Instead of replying by telephone, the recipient may reply electronically. Electronic reply button 485 is included in message 450 for this purpose. Illustratively, clicking on electronic reply button 485 invokes the reply system of the electronic messaging system (as exemplified by buttons 455), but adds some information necessary for replying within the context of a message transmitted through a service provider and a message server. Thus, by clicking on electronic reply button 485, the message ID is automatically included in the reply to service provider 140, in accordance with a pre-agreed-upon protocol. In responding electronically, there may be no need for the recipient to interact with a human operator or to communicate via the telephone network in order to access service provider 140 or message server 120. Instead, the reply (which may include the original message) is transmitted over a communications network to the information service provider. This communications network may be the same as or different from communications network 160. Service provider 140 collects reply overhead data, such as the recipient's address, from information included in the reply and obtains other reply overhead data, such as the sender's address, by using the message ID transmitted with the reply to access the original message overhead data. An electronic reply may include reply message content that is then forwarded by service provider 140 to message server 120.

If the recipient does not want to reply electronically, the recipient may be given the choice to reply with a callback. In such a scenario, the recipient replies using reply button 490, which communicates with the information assistance service provider via a communications network, but indicates a desire to receive a callback from the operator. Clicking on reply-with-callback button 490 opens up a dialog box requesting the recipient's callback telephone number. The recipient then transmits to service provider 140 the callback telephone number, transmitting along with it the message ID. Service provider 140 receives the information, calls up the message overhead data based on the message ID, and calls the recipient at the callback number to establish a telephone connection. After obtaining the relevant reply overhead data, service provider 140 connects the recipient to a message server 120, and the recipient records a reply message in the manner described previously.

There are a number of advantages in using the reply-with-callback function rather than merely calling the service provider as described above. First, because the message ID is transmitted along with the reply, the recipient does not have to dictate the message ID to the service provider, lessening the chance of making a mistake in the dictation or transcription. Second, the reply-to number provided with the message may be a toll call, whereas replying with a callback does not result in the recipient being charged for the reply call. Third, using reply-with-callback allows the original message to be appended to the reply without the service provider having to retrieve it from message server 120, thus reducing the steps needed to complete a reply.

Using stored information to populate fields and ascertain preferences also allows the information assistance service to be used by non-subscribers. For example, contact folders and personal profiles can be established defining the contact information and preferences for one or a group of people.

When a non-subscriber to the information assistance service calls to send an e-mail to someone, the information assistance service can ascertain whether the desired party has a personal profile and/or a contacts folder associated with him. If so, this information can be used to allow the caller to send an e-mail message to the desired party on the terms and conditions defined by the desired party in his personal profile and/or contacts folder. For example, the desired party can define any combination of the following criteria and preferences: who should be allowed to contact him, when (by time of day, day of week etc.), at what e-mail address the desired party should be contacted, and whether the caller can be told the e-mail address of the desired party. These and other capabilities are illustrated in FIGS. 7-16. Of course, additional or different criteria and preferences can be employed while remaining within the scope of the instant invention. Additionally, while these figures contain examples of user interface screens, the data organizations represented by these figures and the user interfaces shown are illustrative only. Those skilled in the art will appreciate that a myriad of other data organizations and user interfaces can be employed while remaining within the scope of the instant invention.

Figure 7:
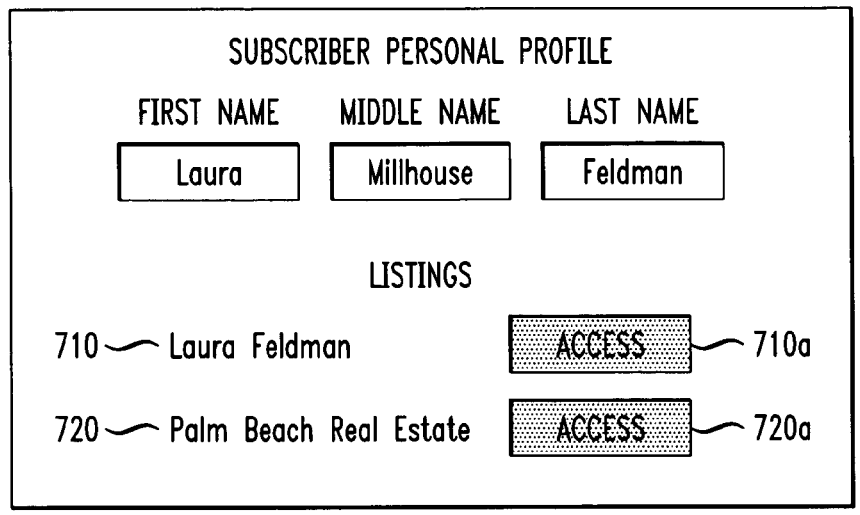
FIG. 7 illustrates an example of multiple listings being associated with a single information assistance service subscriber in accordance with an embodiment of the present invention.

FIG. 7 depicts a portion of the personal profile of hypothetical subscriber Laura Millhouse Feldman. As illustrated in FIG. 7, Laura's account is associated both with her personally and with her business, "Palm Beach Real Estate" ("PBRE"), which the public may or may not know is hers (indeed, Laura may be PBRE's only employee). Laura's contact information and contact preferences can be defined differently depending on whether the caller tells the information assistance service he is trying to contact "Laura Feldman" or "Palm Beach Real Estate." Note that while the term "caller" is used to refer to those who contact the information assistance service to avail themselves of the services offered, this contact does not have to be by telephone. Other means of contacting the information assistance service include e-mail, instant messaging, text messaging etc. Therefore, while the term "caller" is used herein for convenience, those skilled in the art will understand, based on the context in which the term "caller" is used, that it may refer to someone making contact with the information assistance service by means other than a telephone.

Figure 8:
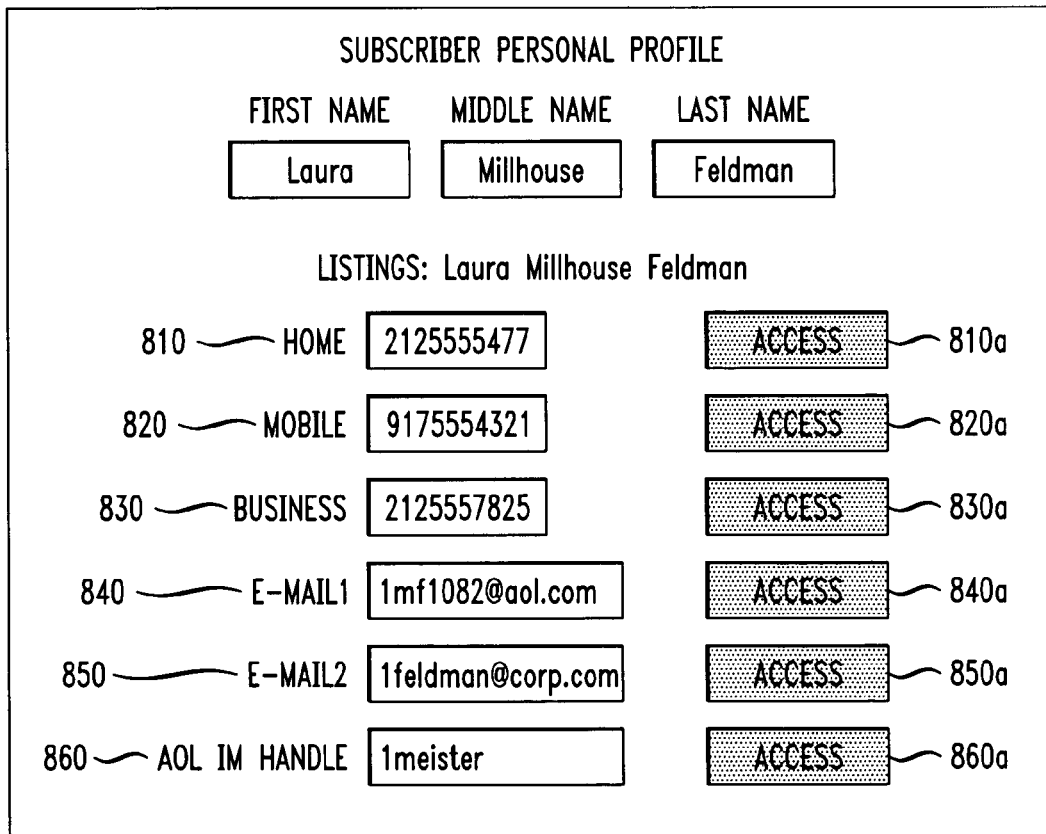
FIG. 8 illustrates an example of contact information associated with a subscriber's listing in accordance with an embodiment of the present invention.

FIG. 8 shows Laura's personal contact information (the contact information associated with the listing "Laura Feldman"), which may in some embodiments be accessed by an operator by pressing access button 710a. Note that such contact information can also be made available to the operator by this or other means whenever someone calls and asks for Laura's contact information or to be connected with her. In addition, as described above, in some embodiments the operator has only the access rights the caller has, meaning contact information is hidden from the operator unless the caller himself has been given the right by the subscriber to have the information. For example, if the caller has been given the right to contact the subscriber on the subscriber's wireless telephone, but has not been given the right to know the subscriber's wireless telephone number, the operator would in turn be given only the right to effectuate a contact between the caller and the subscriber on the subscriber's wireless phone, but the operator would not be able to see the subscriber's wireless telephone number.

As shown in FIG. 8, Laura can be reached in her personal capacity using a number of different technologies, and her profile contains her address information for each of these technologies. For example, her profile contains her home telephone number 810, her mobile telephone number 820 and her business telephone number 830. Her profile also contains non-telephone contact information, such as a personal e-mail address 840, a business e-mail address 850 and an AOL Instant Messaging handle 860. It will be appreciated that a subscriber's personal contact information can contain more, less or different information than is shown in FIG. 8. For example, a subscriber's direct connect number may be included.

Associated with each address is an "Access" button, shown as buttons 810a-860a in FIG. 8, which permit access to and defining/modification of the contact preferences associated with the corresponding addresses. FIG. 9 shows Laura's contact preferences associated with her business e-mail address lfeldman@corp.com which, in one embodiment of the invention, may be accessed by the operator by selecting access button 850a. However, as noted above, operators may not be able to see contact information that callers are not entitled to have. Moreover, in some embodiments, when callers contact the information assistance service to reach a subscriber, the system automatically informs the operator, based on the desired listing and an identification of the caller, of all the rights the caller has; the caller can then be advised of his or her contact options accordingly ("e.g., "I can connect you to Mr. Doe's home or wireless cell phone, or I can give you Mr. Doe's home telephone number"). Finally, while one embodiment of the invention is described with respect to FIGS. 1-6 whereby an e-mail is sent containing a voice message, it will be clear to those ordinary skill in the art that that is not a requirement of all embodiments of the invention.

As shown in FIG. 9, in embodiments of the instant invention, access rights to contact information can be assigned to specific individuals or to classes of people. For example, the same level of access can be given to all relatives, all friends, all business associates etc. Levels of access can also be given to specific individuals. In the preferred embodiment, when an individual member of a class is separately assigned access rights, the access rights assigned to that individual take precedence over the rights assigned to those classes of which he is a member. Those skilled in the art will appreciate, however, that in an alternative embodiment, class rights take precedence over individual rights. Also in the preferred embodiment, individuals who are members of more than one class have the access rights of all the classes to which they belong, although those of skill in the art will appreciate that there are many other ways to deal with this situation as well (all of which are within the scope of the instant invention).

The access rights assigned to each person or class of persons defines the types of access they are permitted to have and when such access is permitted. For example, a subscriber can define whether specific persons or classes of persons can be told her business e-mail address (using the "Disclose" column 910 in FIG. 9), or whether a caller can use the information assistance system to send an e-mail to the subscriber (using the "Connect" column 920 in FIG. 9). If disclosure is not permitted (a "N" appears in Column 910) but connection is permitted (a "Y" appears in Column 920), the effect is equivalent to the "Private" designation described in parent application U.S. Pub. No. 2002/0055351 A1. In this event, the e-mail string between the two parties will be routed through the information assistance system, and all e-mails in the string from the subscriber to the caller will be sent using the anonymous return address feature described above. Note that notwithstanding the fact that the caller may be "replying" to a previously sent e-mail from the subscriber, in a preferred embodiment, the information assistance service will block such "reply" e-mails from the caller during periods in which the caller does not have rights to send the subscriber e-mails. The handling of such unauthorized reply attempts is defined by the "Unauthorized Message (E-Mail)" column 960, as described in more detail below.

The Day and Time columns 930 and 940 are used to define the day and times when the identified level of access is permitted. "Days" can be defined by date, date range (e.g. "11/03-12/15", with year omitted, if intended to be applied every year, or "11/03/04-12/15/04", which would apply to the year 2004 only), days of the week, day of the week ranges etc. "Time" defines the times when access is permitted on the specified days. Note that in this embodiment of the invention, it is assumed that no access is permitted unless it is expressly permitted. If no access is expressly permitted for a given date and time, then access will be denied on that day and time. Those skilled in the art will appreciate that other implementations are possible. For example, the system can be implemented such that the system assumes that access should be granted unless access is expressly denied.

"Unauthorized Message (Voice)" column 950 defines the audio treatment the telephone caller receives when the caller has not been given permission to reach the subscriber by the caller's desired means. For example, the subscriber can prepare a recording to be played to the caller when access is denied, or the subscriber can provide text that the operator can recite to the caller when access is denied. The ability to provide text for the operator to recite rather than a voice recording is useful (though not necessary) because personal preferences may change frequently, in which case subscribers may find it easier to supply (through an information assistance service website, by e-mail or by other means) the information assistance service with text for operators to read than to constantly record new messages. It is possible, however, for the recordings to be made locally by the subscribers and then sent (e.g. by e-mail) to the information assistance service to be played to callers in appropriate circumstances.

Whether callers are played a recording or read a text message, in a preferred embodiment, the information assistance service can record a voice message from the caller after the caller is provided with the message. The information assistance service can also take a written message from the caller, much like a personal assistant would. Whether individual callers or classes of callers should be offered one or both of these options can be defined by the subscriber in his personal profile (not shown). In addition, when written messages from the caller are taken, the subscriber can define in his personal profile how those messages should be delivered to the subscriber (e.g. by e-mail, text message, telephone etc., and which telephone numbers, e-mail addresses etc. should be used). The subscriber can even define a combination of means for delivery of written messages. Of course, voice or text messages can be left irrespective of whether the caller sought to contact the subscriber by telephone or electronically. In fact, even callers who contact the information assistance service electronically can leave messages for the subscriber. For example, a caller who contacts the information assistance service by e-mail can send a recorded message by e-mail to be placed in the subscriber's voice mailbox, or can send a text message to be read to the subscriber.

In one embodiment, messages are only taken from callers when access is denied, because, for example, if a caller is connected to a subscriber's telephone and the subscriber is not available, it is assumed that the subscriber's own voice-mail system will permit the subscriber to leave a message. In other embodiments, callers can leave messages even when access is permitted, or when the caller does not request access at all (e.g., a caller may call the information assistance service and simply ask to leave a message for a subscriber.) In addition in a preferred embodiment, a caller can utilize a returnto-operator capability (e.g. Starback, Autoback) after he is connected in order to leave the subscriber a message or otherwise avail himself of other services offered by the information assistance system.

In the embodiment illustrated in FIG. 9, the messages are prepared to be played (or read) to callers as a function of who the caller is, when they tried to reach the subscriber and how they tried to reach the subscriber (e.g. by business e-mail, personal e-mail, mobile telephone etc.) However, those skilled in the art will appreciate that other implementations are possible. For example, a single message can be defined to apply to all failed attempts to reach the subscriber (either on a person by person basis, class by class basis and/or caller-independent basis), irrespective of how the caller attempted to reach the subscriber (e.g., the same message would apply to failed attempts to reach the subscriber on her business e-mail account as would apply to attempts to reach her on her mobile phone as would apply to callers who expressed no preference as to how they wished to reach the subscriber). Non-audio messages may also be defined to be provided to the caller when connection attempts fail, such as e-mail messages, text messages, instant messages etc. Those skilled in the art will appreciate that there are many other permutations and combinations of message types, message delivery means and ways to identify preferences for delivery of messages, all of which are expressly contemplated and within the scope of the present invention.

It is contemplated that some callers may prefer to contact the information assistance service electronically in an attempt to reach subscribers, particularly those callers who want to communicate with subscribers electronically. Therefore, in one embodiment of the present invention, the information assistance service provides web page(s) though which callers can make their information and connection requests. For example, callers desiring to send a subscriber an e-mail may access a web page similar to that shown in FIG. 10. The caller enters his name, his (return) e-mail address, the name of the subscriber he's trying to reach, authentication information (e.g. a password defined by the subscriber), and the text of the e-mail message. The information assistance system then authenticates the caller, checks his permissions as defined by the subscriber and, if the caller has permission to send the e-mail, the e-mail will be sent and the caller notified, preferably by displaying a message on the caller's screen or by sending a confirmatory e-mail to the caller (though other confirmation means can be utilized, such as IM, text messaging, telephone etc). The method of confirmation can be defined either by the subscriber or the caller. If the caller has rights to know the subscriber's e-mail address, the subscriber's e-mail address will be displayed to the caller as well. If the caller has rights to send e-mail to at least two of the subscriber's e-mail accounts, the system can use subscriber preferences to indicate which account the message will be sent to (not shown), or the caller can be displayed a choice to select from (e.g. "business e-mail address," "personal e-mail address" etc., as defined in the subscriber's preferences).

Turning back to FIG. 9, if a caller does not have permission to either know or connect to Laura's business e-mail address, the "Unauthorized Message (E-mail)" column 960 of FIG. 9 defines the treatment the caller will receive (note that this column also defines the treatment of callers who attempt to "Reply" to previous e-mails from the subscriber at times they are not permitted to e-mail the subscriber). The entries in this column can point to content to be e-mailed to the caller or, if the caller is using the web page provided by the information assistance service, the content that should be displayed to the caller. This e-mailed or displayed content can include text, pictures, an audio message to be played or e-mailed to the caller (such as audio message 470 of FIG. 4B), or any other information. Note that, although not shown in the figures, the same recording defined to be played to callers when they are denied access to subscribers after calling the information assistance service can be defined to be played (e.g. using the information assistance service web page) or sent (e.g. by e-mail) to callers denied access after contacting the information assistance service by electronic means. Similarly, the same text read by the operator to callers when they are denied access to subscribers after calling the information assistance service can be defined to be sent or displayed to callers when they are denied access after contacting the information assistance service by electronic means.

Of course, there are other electronic ways a caller can request access to a subscriber. For example, if the caller wants to send an e-mail to a subscriber, the caller can send an e-mail to the information assistance service containing all the necessary fields. In addition, callers can use an information assistance service web page or other electronic means to attempt to establish other forms of electronic communication with subscribers, such as instant messaging or text messaging etc, and can even use electronic means to attempt to reach a subscriber telephonically. All such embodiments are within the scope of the instant invention.

Turning to Laura's specific preferences for access to her business e-mail account, as shown in FIG. 9, she has utilized four classes to define access to it: "relatives," "friends" "business associates" and "unknown." Of course, more, less and/or different classes can be recognized by the system and employed by subscribers while remaining within the scope of the instant invention. In Laura's case, she has decided that neither friends nor relatives should be allowed to know her business e-mail address (the "Disclose" entry is set to "N") or to send an e-mail to her at that address through the information assistance provider (the "Connect" entry is set to "N"). Both friends and relatives who call the information assistance provider in an attempt to send such an e-mail to Laura will hear "Recording 1" which, as described above, Laura may herself have previously recorded. In addition, when relatives and friends unsuccessfully attempt to send Laura an email by electronically contacting the information service provider, they will electronically receive "Content 1". Unlike friends and relatives, business associates are permitted to reach Laura at, and to obtain, her business e-mail address at all times.

Although Laura has defined her preferences such that members of the class "Friends" do not have access to her at her business e-mail address, Laura has a specific friend, Duffy Dyer, who she has granted permission to reach her at her business e-mail (the "Connect" entry is set to "Y"). However, she only wants Duffy to be able to send her an e-mail at this address between 8 a.m. and 5 p.m. on a specifically defined day (Dec. 13, 2004) and, even then, she does not want her e-mail address disclosed to him (the "Disclose" entry is set to "N"). As described above, in a preferred embodiment, the access rights granted to an individual take precedence over the rights granted to a class to which that individual is a member, meaning the rights granted to Duffy take precedence over the rights granted to the "Friends" class. Similarly, although Laura has defined her preferences such that members of the class "Relatives" do not have access to her at her business e-mail address, Laura's brother in law Corey Feldman has also been given rights to reach her at her business e-mail, but only during business hours (Monday thru Friday, 8 a.m. to 5 p.m.) However, he too is not permitted to know Laura's business e-mail address. Laura's husband Martin Feldman, however, has rights to reach her at, and to obtain, her business e-mail address at all times.

Finally, the last row in FIG. 9 shows Laura's preference that "Unknown" callers (that is, callers she has not identified personally in her contacts folder and who cannot authenticate themselves as belonging to an identified class) should be denied all access to her business e-mail account. She has recorded a special message to be played to such callers ("Recording 3"), and has identified specific content to be sent and/or displayed to unknown callers ("Content 5") who try to reach Laura by electronically contacting the information assistance service.

FIGS. 11A-11C are the entries in Laura's contacts folder for her husband Martin Feldman, brother in law Corey Feldman and friend Duffy Dyer, respectively. As shown, subscribers can use their contacts folder to store not only home addresses, telephone numbers, e-mail addresses etc. associated with their contacts, they can also store the class the contact belongs to (1110) and authentication information for the contact, such as the contact's mother's maiden name (1120) and a password which can be provided by the contact to authenticate himself (1130). Information can also be stored as to whether the contact has provided a voice sample to the information assistance service (1140). If so, when the contact calls, the contact's speech will be compared with the stored voice sample for authentication purposes. One, or some combination of these and/or other criteria can be used to authenticate the identity of a caller, and all are within the scope of the instant invention.

Of course, a contact's address information can also be used for authentication purposes. For example, the ANI received by the information assistance service can be compared to the home, mobile and business telephone numbers of the caller to see if there is a match. In addition, if a caller attempts to reach a subscriber by e-mailing the information assistance service, the e-mail address of the caller can be compared to that associated with the caller in the contacts database to see if there is a match. Callers who contact the information assistance service electronically may also be required to provide telephone numbers where they can be called back in order to provide a voice sample that can be used for authentication purposes. This callback procedure can be implemented to occur automatically (e.g., without the intervention of a human operator), or it may be facilitated by a human operator.

FIG. 12 is an example of hypothetical subscriber Laura's class authentication preferences. These preferences will be used to authenticate callers who try to reach Laura by indicating to the information assistance service that they are a member of a class Laura recognizes, but about whom no personal authentication information has been stored in Laura's contacts folder.

In the example of FIG. 12, Laura has defined her class authentication preferences for three different classes, the "Relatives" class, the "Friends" class and a "Brown Alumni" class. In order to authenticate themselves as members of Laura's family, the callers can either recite the password Laura has presumably told her family members (in this case "Grandma is great,") or, if they do not know the password, they will be asked a question by the operator that Laura believes only her family members would know the answer to (in this case "Who are Laura's two grandmothers and what are their maiden names?") In a preferred embodiment, the operator will not himself see the answers to the authentication questions or the passwords, but rather will type the caller's answer into the system and await a response from the system as to whether the caller's answer is correct. Of course, in alternative embodiments, the operator can see the answer on the screen and can visually compare the caller's answer to the correct answer.

As also shown in FIG. 12, if a caller identifies himself to the information assistance service as a friend of Laura's, he will be authenticated only if he knows the password "Hail to the Conquering Heroes." On the other hand, callers who identify themselves as fellow Brown alumni will not be asked a password—instead, pursuant to Laura's defined preference, the information assistance service will authenticate such callers by using the Brown alumni website. Obviously, preferences can be defined such that a number of authentication criteria can be used. For example, Brown alumni can be asked a password and further authenticated by accessing the Brown alumni website.

In one embodiment of the invention, individuals can be defined to constitute their own class. A subscriber may wish to do this, for example, if the subscriber believes a specific individual who does not belong to any other defined class may try to reach her through the information assistance service, but the subscriber has not (and does not wish to) set up a separate entry in her contacts folder for the individual. In the example of FIG. 12, Laura has identified one such individual as his own class, "Jim Thomas," whose authentication question is "What elementary school did you attend?"

Those of ordinary skill in the art will appreciate that more, less or different authenticating criteria can employed. They will also appreciate that there are any number of ways classes can be defined, and that an information assistance service can pre-define classes, allow subscribers to define their own classes, and preferably both. All such embodiments are within the scope of the instant invention.

FIG. 13 shows Laura's contact preferences for her mobile phone (which, as shown at elements 1360 and 820, has the telephone number 917-555-4321). 1360 shows the designation "(Voice)" next to the mobile telephone number 917-555-4321, which indicates that these are Laura's contact preferences for those who would try to reach her by calling her mobile phone. A different set of contact preferences (not shown) can be defined for text messaging Laura on her mobile phone.

Figure 15:
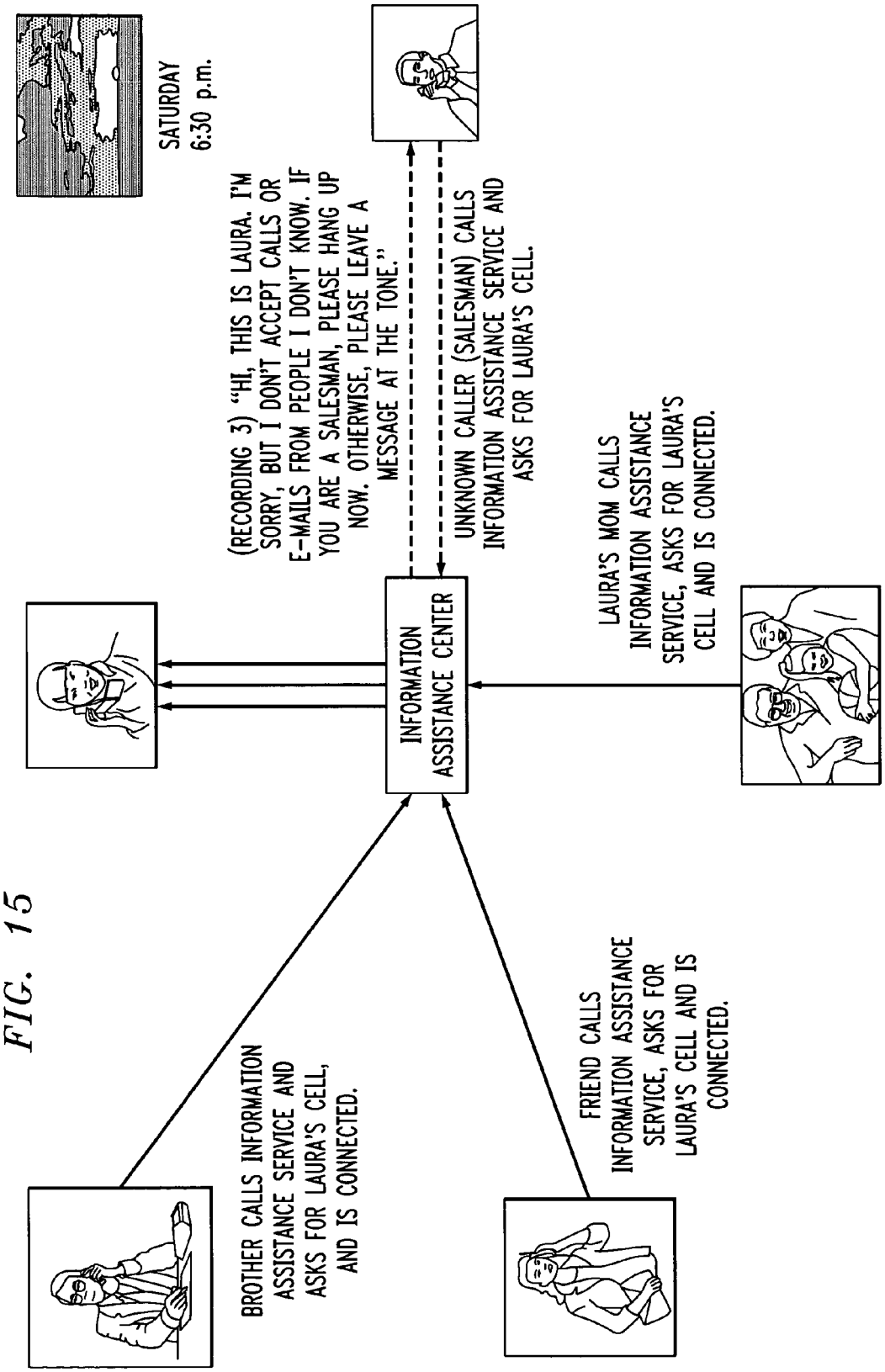

Columns 1310-1350 have the same meanings with respect to Laura's mobile phone number as columns 910-950 had with respect to Laura's personal e-mail address. Thus, in the example of FIG. 13, Laura has defined her contact preferences such that friends and relatives can be connected to (but not obtain the number of) her mobile phone weekdays from 6 a.m. to 7:30 a.m. and 6 p.m. to 10:30 p.m., and on weekends from 9 a.m. to 11 p.m.—presumably times she is not working and not trying to sleep. Although Laura's mother Jane Lee is of course a member of the "relative" class, a separate preference has been identified for her, because she is to receive a different recording ("Recording 5") than other relatives on Oct. 28, 2004 if she calls during times when access to Laura's mobile phone is denied. Finally, Laura has granted her doctor, Dr. Corey, permission to reach her on her mobile phone at all times. FIG. 14 diagrammatically depicts the different treatment Laura has defined in her profile (FIG. 13) for her brother, her friend, her mother and Doctor Corey to receive if they try to reach her on her mobile phone at 1:00 p.m. on Thursday, Oct. 28, 2004. FIG. 15 diagrammatically depicts the different treatment Laura has defined in her profile (FIG. 13) for her brother, her friend, her mother and an unknown salesman to receive if they try to reach her on her mobile phone on a Saturday at 6:30 p.m.

In a preferred embodiment, the information assistance service can create a log (not shown) for subscribers of each caller who attempted to reach them, how the caller contacted the information assistance service (e.g. telephone, e-mail, information assistance service web page etc.), what information was given to the caller, whether any connection to the subscriber was made and on what technology (e.g. connected to mobile phone, e-mail sent to business e-mail account etc.), whether the caller utilized a return-to-operator feature to attempt to reach the subscriber using a different technology, why the caller was denied the information or connection he requested, what treatment was given when the caller's request was denied and/or whether the caller received information about or connected to a different technology when his initial request was denied (e.g., the caller asked to be connected telephonically to Laura's mobile phone, was told he didn't have the right to do so but did have the right to send a text message to Laura's mobile phone, which he did), whether the caller left a message and how the caller left a message (e.g. voicemail, message left with operator), and/or any other information or combination of these and other facts regarding callers who tried to reach the subscriber. Preferably, subscribers would be able to access this log on a website set up by the information assistance service. The log can also be e-mailed to the subscriber or provided to the subscriber by any other means.

Referring now back to FIG. 7, Laura has defined different contact preferences for the PBRE listing (i.e. for callers to the information assistance service who indicate that they want to reach PBRE) than she did for the Laura Feldman listing. FIG. 16 shows Laura's contact preferences for the PBRE listing. Again, in one embodiment of the instant invention, the operator would have access to the information in FIG. 16 by selecting "Access" button 720a, and in other embodiments, the operator would have access only to information the caller has access to.

Laura has utilized the "All" class in the contact preferences of FIG. 16, which all callers to the information assistance service belong to. As Laura has defined her preferences, any caller that wants to reach Palm Beach Real Estate during normal business hours will be connected to 212-555-7825, which is the same number Laura has identified as her own business number (as shown at element 830.) Note that Laura has chosen not to divulge the telephone number of Palm Beach Real Estate to callers, even though she would presumably like as many customers as possible. One reason for this is that she might want to change the telephone number associated with PBRE frequently, or she might want which of her numbers she uses as the PBRE number to change frequently based on day of week, time of year etc. (e.g. Laura may have different offices or different homes, and may want the number associated with Palm Beach Real Estate to change at her will depending on where she is). Therefore, in advertising for Palm Beach Real Estate, on business cards, in public directory listings, on the PBRE website etc., she may identify the number for Palm Beach Real Estate as being the number of the information assistance service (in the preferred embodiment 888-411-1111), so that callers will know how to reach PBRE without ever having to know the telephone number they are actually being connected to. (Note that Laura may choose to similarly tell people to contact her personally through the information assistance service, may give the information assistance service number out as her personal number, and may advise people, on a personal website or otherwise, that she can be reached through the information assistance service and the classes that people can identify themselves as belonging to.)

Callers are not going to use the information assistance service in lieu of contacting PBRE directly, however, if they are required to pay a fee to the information assistance service for every such call. Therefore, in a preferred embodiment, subscribers have the ability to define when, and for whom, they will pay the fee to the information assistance service instead of the caller. In FIG. 16, the "Subscriber Pays?" column 1670 is used to specify that Laura will pay for all information assistance service charges for callers who request PBRE. The information assistance service may offer flat monthly fees or other flexible billing arrangements to subscribers who wish to use the service in this manner. In some embodiments, callers can be advised (possibly at the subscriber's discretion as defined in the subscriber's preferences) before they are either given any information or permitted to make any connection whether or not they will have to pay an information assistance charge. If a caller is advised that he would have to pay such a charge either to get the information requested or to make the requested connection, and the caller chooses not to pay, he can disengage from the information assistance service without incurring any charges. Note that while, in a preferred embodiment, subscribers can identify on a caller by caller, class by class and/or connection address by connection address basis whether the subscriber will accept the information assistance charges for calls, those of ordinary skill in the art will appreciate that there are many other ways that "subscriber pays" preferences can be defined, all of which are within the scope of the instant invention.

In the example of FIG. 16, Laura is particularly eager for PBRE to do business with Donald Trump. Therefore, she has defined her preferences such that when Donald Trump calls for PBRE, he is always connected. Moreover, she has provided a hierarchy of numbers to be used to try to reach her if The Donald tries to reach her during off hours. As shown in Column 1660, first the operator will try Laura's home number (212-555-5477), then he will try her mobile phone (917-555-4321) and then, if all else fails, the operator will offer to send a text message to Laura's mobile phone. The personal profile can be defined (not shown) such that the operator can try each of these numbers in order while the caller holds and, if he determines that the subscriber is available, he will connect the caller to the subscriber. Alternatively, the profile can be defined such that the caller is connected to the first number on the list. If that connection is unsuccessful or unsatisfactory to the caller, the caller can employ a return to operator feature (e.g. Starback and Autoback), after which the operator will try to connect the caller to the next address in the subscriber's hierarchy (obviously, once returned to an operator, a caller may available himself of any other information assistance service he has permission to receive). As another alternative, the profile can be defined to utilize the invention described in commonly assigned, co-pending application Ser. No. 10/805, 891, filed on Mar. 22, 2004, hereby incorporated by reference. That is, a personal dialing queue can be created for the caller containing all of numbers in the hierarchy of numbers illustrated in FIG. 16, such that Donald Trump would be automatically connected to successive numbers in the hierarchy. Those skilled in the art will realize that most of the features described in Ser. No. 10/805,891 are applicable to such use of the personal dialing queue with the instant invention, and all such uses are expressly contemplated.

Note that the preferences defined for Donald Trump individually cover only his off-hour attempts to reach PBRE, since during regular business hours, he will be treated simply like one in the "All" class of callers, and will be connected to 212-555-7825 just like everyone else. In addition, while not shown, the contact hierarchy can include electronic addresses such as e-mail addresses. For example, if for any reason sending a text message to Laura didn't work in the embodiment of FIG. 16, Laura could have included in her personal profile that the information assistance service should send her an e-mail at an identified e-mail account on Donald's behalf, that Donald be told Laura's e-mail address and asked to send her an e-mail himself, etc.

Figure 17:
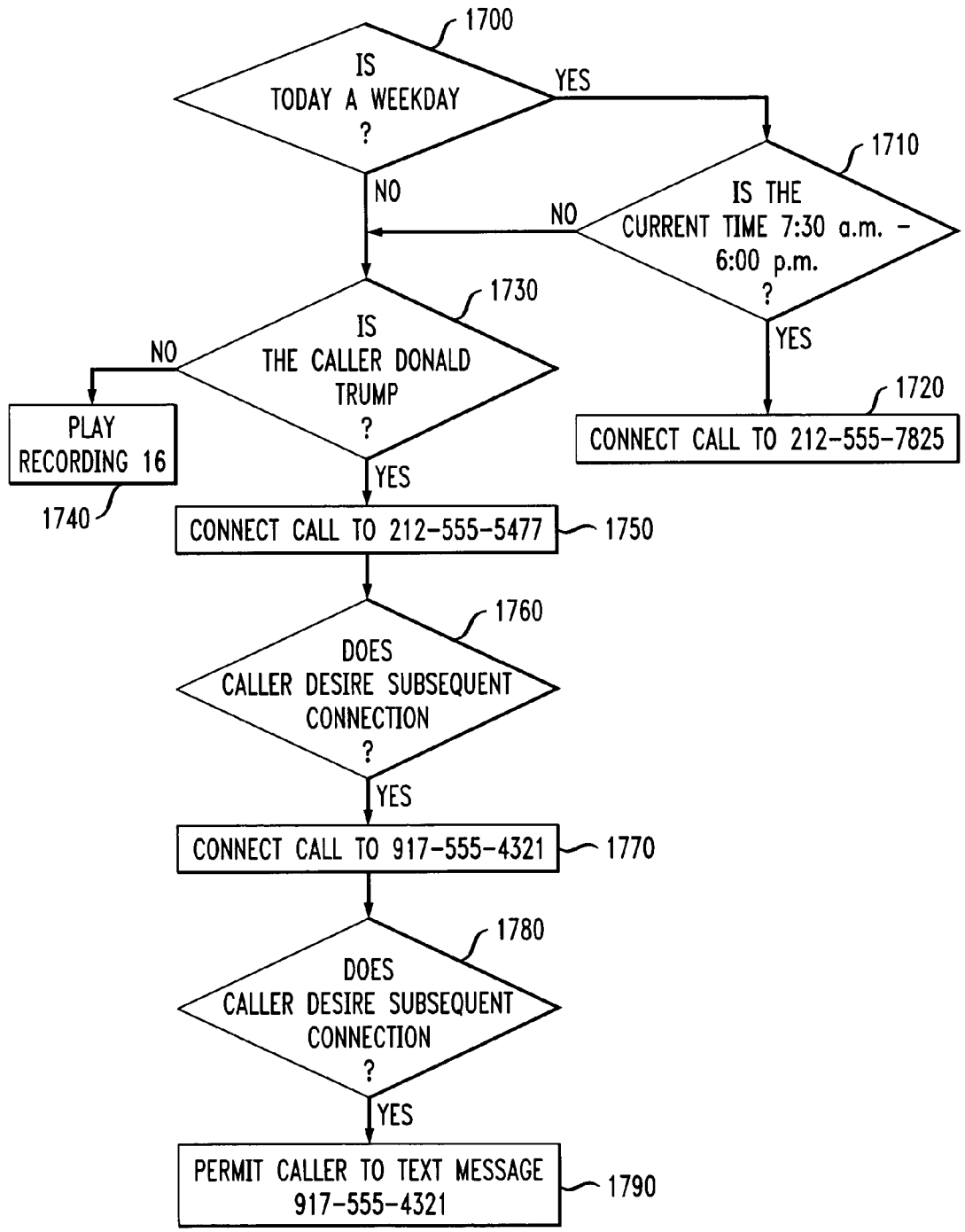
FIG. 17 is a flowchart of a process that can be employed by an information assistance service to enforce the contact preferences of FIG. 16.

FIG. 17 is a flowchart depicting one embodiment of the steps taken by the information assistance service when a caller requests Palm Beach Real Estate. In step 1700, the information assistance service determines if the current day (that is, the day of the caller's call to the information assistance service) is a weekday. If it is, it is determined at step 1710 whether the current time (that is, the time of the caller's call to the information assistance service) is between 7:30 a.m. and 6:00 p.m. If that question is resolved in the affirmative, the caller's call is connected to 212-555-7825 in step 1720. As described above, and as shown in FIG. 16, pursuant to Laura's contact preferences, all calls to PBRE which come in to the information assistance service on weekdays between 7:30 a.m. and 6:00 p.m. are directed to 212-555-7825.

If it is determined at step 1700 that the current day is not a weekday, or it is determined that the current time is not between 7:30 a.m. and 6:00 p.m., then it is next determined at step 1730 whether the caller is Donald Trump. As described above, pursuant to Laura's contact preferences, only Donald Trump is permitted to reach PBRE (which in this example is Laura herself) during off-hours. If it is determined at step 1730 that the caller is not Donald Trump, Recording 16 is played to the caller at step 1740.

If it is determined at step 1730 that the caller is Donald Trump, then, in the example of FIG. 17, the call is connected, at step 1750, to the first in the hierarchy of numbers Laura has defined, 212-555-5477. Thus, FIG. 17 presumes that Laura has defined her profile such that Donald Trump will be connected to this number. As explained above, however, one alternative would be for her to have defined her profile such that the operator would try each of the telephone numbers in the hierarchy while Donald Trump stayed on hold, and would connect him only after determining that Laura was available at one of these phone numbers to accept the call.

After that connection is made, it is determined at step 1760 whether the caller desires a subsequent connection. As discussed above, this determination can be made any number of ways, including (i) the caller employing a return-to-operator feature (e.g. Starback, Autoback) and indicating to an operator that he wishes to be connected to the next number identified in the hierarchy (this can be done by telling a human operator or by pressing a specified DTMF key(s) when the call is returned to the information assistance center); (ii) monitoring the connection established for a command from the caller (e.g. entry of specified DTMF key(s)) to be connected to the next number identified in the hierarchy; (iii) employing personal dialing queues as described in Ser. No. 10/805,891 such that the caller will automatically be connected to the next number identified in the hierarchy on the occurrence of a network status condition (e.g. busy, ring-no-answer, network communication problem etc.) or called party termination; and/or (iv) by any other means.

If it is determined in step 1760 that the caller does desire a subsequent connection, the caller is connected, at step 1770, to the next number in the hierarchy (917-555-4321). After that connection is made, if it is determined at step 1780 that the caller again desires a subsequent connection, the caller in step 1790 is afforded the opportunity to send a text message to 917-555-4321. This can be accomplished by connecting the caller to a human operator when it is determined in step 1780 that caller desires a subsequent connection, or by connecting the caller to a system which automatically permits the sending of such a text message (e.g., a system which performs speech to text conversion and sends the message, a system which provides the caller with the option to send one or more predefined text messages, or any other system which permits the sending of a text message without human operator intervention). Those skilled in the art will understand that FIG. 17 depicts just one non-limiting example of the order of steps which an information assistance service can perform to effectuate the contact preferences of FIG. 16, and that such steps can be performed by a human operator or automatically.

Because, as illustrated in the above examples, the same telephone numbers can be used for different listings, it would be helpful if the subscriber knew before answering the telephone which listing the caller had asked for. In Laura's case, for example, she might want to answer the telephone "Palm Beach Real Estate" if the call originated from someone requesting that listing. In embodiments of the invention, this information can be sent to the subscriber's telephone (or other call receiving device, such as a computer) by the information assistance service with the call setup information (e.g. as "caller-ID" type data), or as a text message, so that the subscriber can see it before he picks up the call. Other ways it can be sent to the subscriber include by instant messaging and by displaying the information on a web page provided by the information assistance service, or in any other manner as defined in the subscriber's preferences. Of course, subscribers who are contacted by callers using electronic means can be sent the same information.

It should be clear from the above definition that subscribers have a great deal of flexibility in defining their connection preferences. Indeed; subscribers may have so much flexibility and so many options that they may at times unknowingly define contradictory preferences. Therefore, in a preferred embodiment of the invention, the information assistance system will can perform automatic sanity checks on the subscriber's preferences, and can inform the subscriber where and how their preferences are contradictory. Preferably, the subscriber is advised as soon as possible, using the most appropriate medium, after the contradictory preference is defined.

The present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims. For example:

(i) The invention equally applies regardless of whether feature group D (FGD) type signaling, SS7 out-of-band signaling, or other signaling is used for communications between carrier switches and switch 310 of FIG. 3.

(ii) Although certain features and capabilities have been shown by way of example with respect to callers who desire to reach subscribers by telephone, and others have been shown with respect to callers who desire to reach subscribers by electronic means, those skilled in the art will appreciate that most of these features and capabilities apply to both. All such combinations and permutations of features, capabilities and manner of desired connection are hereby expressly contemplated and disclosed as if expressly set forth herein;

(iii) Although certain features and capabilities have been shown by way of example with respect to callers who contact the information assistance service by telephone in an attempt to reach a subscriber, and others have been shown with respect to callers who contact the information assistance service by electronic means in an attempt to reach a subscriber, those skilled in the art will appreciate that most of these features and capabilities apply to both. All such combinations and permutations of features, capabilities and means of contacting the information assistance service are hereby expressly contemplated and disclosed as if expressly set forth herein;

(iv) Although certain features and capabilities are described as being provided through contacts folders, and others are described as being provided by personal profiles, the invention is not so limiting. Those skilled in the art will appreciate that embodiments of the invention can be implemented such that features and capabilities described herein with respect to contacts folders can be provided with personal profiles, and vice versa. Indeed, embodiments of the instant invention can be employed which utilize neither contacts folders nor personal profiles.

(v) Those skilled in the art will appreciate that while some embodiments of the instant invention are described as employing the techniques described in U.S. Pat. No. 5,797,092 (Starback), U.S. Pat. No. 6,456,709 (AutoBack), and U.S. application Ser. No. 09/865,230 (personal profile), many other uses of the inventions described in those documents can be made by and with the instant invention, all of which are hereby expressly contemplated and disclosed as if expressly set forth herein. For example, the messaging service in accordance with the invention may be provided as a service to a caller who has been reconnected to the information assistance service because the call to a destination party encountered a busy signal, ring-no-answer, network communication problem, or other non-completion signal. The feature that automatically reconnects the caller to the information assistance service in event of non-completion of a call is called Autoback® and it is described, e.g., in U.S. Pat. No. 6,456,709 ("the '709 patent"), hereby incorporated by reference. The '709 patent discloses that when the caller is reconnected, the caller is provided with a menu of directory assistance service options, including the option to continue monitoring the ring tone (if a ring-no-answer condition exists) or to re-dial the same number (if a busy signal exists). The present invention provides another directory assistance service to callers returned to the operator if their call is not completed. In such a case, the caller can opt to send a message to the called party. The message may be sent, e.g., via e-mail and may comprise, e.g., a voice or text message, as described above.

One implementation of this aspect of the invention is as follows. The caller initially calls the information assistance service for connection information concerning a desired called party. As part of the service, it attempts to complete the call to the called party for the caller, but the call encounters a ring-no-answer condition or a busy signal or other indication of an incomplete call. One or more processors within servicing switch 310 detect that the call is incomplete and reconnect the caller with the information assistance service. If a live operator comes on, the caller can request the operator's assistance to send an e-mail message to the called party. To that end, the caller may relay to the operator the message overhead data, including the e-mail or other destination address of the called party (which may come from the caller's personal profile or contacts folder), the caller's name and return address, the subject of the message, and CC or BCC addressees. The message overhead data are transmitted, along with the ANI, to message server 120, the caller records the message via the message server, the message server appends the message overhead data to the message and transmits the full message in a manner described above.

If the information assistance service is automated, a messaging option can be added to the voice response unit (VRU) menu described in the '709 patent. In such a case, the caller chooses the messaging option and the VRU (voice server 330) prompts the caller for message overhead data. For receiving some message overhead data, such as the destination address, that is more easily understood and transcribed by a human, the VRU may switch the caller to a live operator.

One advantage of this aspect of the invention is that if the reason for a busy signal is that the called party is online using the same telephone line, sending a message in this way still allows the caller to communicate with the called party. Similarly, if the called party is not at the called number (a ring-no-answer condition), a message sent to a PDA or wireless telephone with an e-mail capability may allow the caller to communicate with the called party more quickly than if the caller merely left a standard answering machine message.

(vi) While, in the preferred embodiment, the sending of e-mail with return address anonymity is effectuated by the information assistance service sending an e-mail on behalf of the caller to the subscriber, another way this can be done in an alternative embodiment is to provide the caller with a dummy e-mail address. When the caller sends e-mail to the dummy e-mail address, the e-mail is sent to the information assistance service, which modifies the message overhead data and sends the e-mail on to the subscriber.

(vii) Callers, as well as subscribers, can request that their e-mails be sent with return address anonymity;

(viii) Group contacts folders and personal profiles can be established in the first instance by the information assistance service, using defaults. In this way, the invention can be conveniently used with commercial database contact information and the like, such as landline telephone listings, wireless listings when they are available, etc, in order to provide directory assistance with much greater user control over who has the number and who does not. Rather than having to choose between "listed" and "unlisted", for example, users can employ aspects of the instant invention to define who has access to the listing, who can be connected to the listing, and when. The information assistance service may set up default listings for all users (e.g. unlisted), which individual users can then modify to suit their preference.

(ix) While many of the examples are described in terms of "callers" attempting to reach "subscribers", those skilled in the art will appreciate that the invention is not so limited. The invention, in most of its aspects, can be employed with any persons or entities constituting either the requesting party (the party contacting the information assistance service with the wish to reach the desired party) or the desired party.

(x) In a further variation, the caller who had been connected to a called party through use of an information assistance service may invoke further information assistance during the call, as described in co-pending, commonly-assigned Provisional Application Ser. No. 60/414,965, filed Sep. 30, 2002, incorporated herein by reference. In that variation, either the caller or the called party may summon the operator during a call, the operator is conferenced in, and, at the request of either party, the operator may then connect the call to message server 120. In such a way, either or both parties to the call may record a message. Identifying information sent by information/call center 110 to message server 120 allows for the message to be associated with destination address information obtained by service provider 140 from either the caller or called party. Although this process is described with respect to information/call center 110 in arrangement 100, it could easily be handled using information/call center 510 and arrangement 500 in FIG. 5A;

(xi) Information/call centers 110 and 510 are disclosed herein in a form in which various functions are performed by discrete functional blocks. However, any one or more of these functions could equally well be embodied in an arrangement in which the functions of any one or more of those blocks or, indeed, all of the functions thereof are realized, for example, by one or more appropriately programmed processors. Also, some blocks (e.g., 120, 150, 350, 360, etc.) can comprise more than one unit.

What is claimed is:

1. A method for providing a communication assistance service by a communication assistance service provider comprising:
   receiving a communication at the communication assistance service provider from a first person seeking a contact information to communicate with a second person;
   receiving from said first person identifying information associated with said second person;
   retrieving a profile of said second person, said profile including at least one contact information and at least one;
   contact preferences associated with said contact information; and
   providing communication between said first person and said second person in accordance with said contact preferences.

2. The method of claim 1, wherein said contact preferences comprise connection preferences.

3. The method of claim 2, wherein said connection preferences comprise preferences respecting one or more entities which the communications assistance provider should allow to connect to said second person.

4. The method of claim 2, wherein said connection preferences comprise preferences respecting the technologies which the communications assistance provider should use for establishing connections with said second person.

5. The method of claim 4, wherein said technologies comprise telephony.

6. The method of claim 5, wherein said telephony comprise wireless telephony.

7. The method of claim 4, wherein said technologies comprise e-mail.

8. The method of claim 4, wherein said technologies comprises instant messaging.

9. The method of claim 2, wherein said connection preferences comprise preferences respecting when the communications assistance provider should establish connections with said second person.

10. The method of claim 9, wherein said preferences respecting when the communications assistance provider should establish connections with said second person comprise time of day preferences.

11. The method of claim 9, wherein said preferences respecting when the communications assistance provider should establish connections with said second person comprise day of week preferences.

12. The method of claim 9, wherein said preferences respecting when the communications assistance provider should establish connections with said second person comprise date-preferences.

13. The method of claim 3, wherein said connection preferences are different based on what form of entity is said first person is.

14. The method of claim 13, wherein said one or more entities comprise natural persons.

15. The method of claim 13, wherein said one or more entities comprise businesses.

16. The method of claim 1, wherein said contact preferences comprise disclosure preferences respecting disclosure of contact information associated with said second person.

17. The method of claim 16, wherein said disclosure preferences comprise preferences respecting one or more entities to whom the communications assistance provider should disclose contact information respecting said second person.

18. The method of claim 3, wherein said contact preferences comprise disclosure preferences respecting disclosure of contact information associated with said second person.

19. The method of claim 18, wherein said disclosure preferences comprise preferences respecting to which of said one or more entities the communications assistance provider should disclose contact information respecting said second person.

20. The method of claim 16, wherein said contact information comprises one or more telephone numbers.

21. The method of claim 20, wherein said one or more telephone numbers comprise wireless telephone numbers.

22. The method of claim 16, wherein said contact information comprises one or more e-mail addresses.

23. The method of claim 16, wherein said contact information comprises one or more instant messaging handles.

24. The method of claim 16, wherein said disclosure preferences comprise preferences respecting when the communications assistance provider should disclose contact information respecting said second person.

25. The method of claim 24, wherein said preferences respecting when the communications assistance provider should disclose contact information respecting said second person comprise time of day preferences.

26. The method of claim 24, wherein said preferences respecting when the communications assistance provider should disclose contact information respecting said second person comprise day of week preferences.

27. The method of claim 24, wherein said preferences respecting when the communications assistance provider should disclose contact information respecting said second person comprise date preferences.

28. The method of claim 1, wherein said contact preferences comprise preferences respecting the treatment a class of persons not identified in said contact preferences should receive when one of said class of persons comprises said first person.

29. The method of claim 1, wherein said contact preferences denote that a communication, delivered to said second person at said contact information is performed without disclosing said contact information to said first person.

30. The method of claim 29, wherein said communication delivered to said second person by said first person is performed without disclosing a contact information of said first person to said second person.

31. The method as claimed in claim 30, further comprising the step of allowing said second person to reply to said first person without having said contact information of said first person.

* * * * *